US007292914B2

(12) United States Patent
Jungmann et al.

(10) Patent No.: US 7,292,914 B2
(45) Date of Patent: Nov. 6, 2007

(54) REMOTE ACCESS TO CHEMICAL DISPENSE SYSTEM

(75) Inventors: Ronald D. Jungmann, Maplewood, MN (US); Bruce W. Weber, Stillwater, MN (US); James M. Zoll, Northfield, MN (US); Clyde A. Bailey, Hastings, MN (US); Jun Wu, Vadnais Heights, MN (US)

(73) Assignee: Ecolab Inc., Saint Paul, MN (US)

( * ) Notice: Subject to any disclaimer, the term of this patent is extended or adjusted under 35 U.S.C. 154(b) by 162 days.

(21) Appl. No.: 10/188,620

(22) Filed: Jul. 2, 2002

(65) Prior Publication Data

US 2004/0015269 A1 Jan. 22, 2004

Related U.S. Application Data

(60) Provisional application No. 60/312,587, filed on Aug. 15, 2001, provisional application No. 60/304,587, filed on Jul. 10, 2001.

(51) Int. Cl.
*G05D 11/02* (2006.01)

(52) U.S. Cl. .................. 700/285; 700/231; 700/283; 222/71

(58) Field of Classification Search ................ 700/231, 700/239–241, 281–285, 83; 222/71
See application file for complete search history.

(56) References Cited

U.S. PATENT DOCUMENTS

| 33,861 A | 12/1861 | Whitney |
| 3,743,598 A | 7/1973 | Field |
| 3,754,871 A | 8/1973 | Hessel et al. |
| 3,772,193 A | 11/1973 | Nelli et al. |
| 3,774,056 A | 11/1973 | Sample et al. |
| 3,826,113 A | 7/1974 | Noraas et al. |
| 4,040,515 A | 8/1977 | Hessel et al. |

(Continued)

FOREIGN PATENT DOCUMENTS

CA     1333099     11/1994

(Continued)

OTHER PUBLICATIONS

Clover Systems Inc.'s product description of InfAc, 4 pages, including specifications and features.

*Primary Examiner*—Leo Picard
*Assistant Examiner*—Alexander J Kosowski
(74) *Attorney, Agent, or Firm*—Shumaker & Sieffert, P.A.

(57) ABSTRACT

A system for controlling and monitoring operations of a chemical dispense system from a remote location is disclosed. The chemical dispense system includes a formulator for preparing a chemical product using one or more component chemical concentrates. The chemical dispense system also includes an allocator for managing the distribution of formulated chemical products to a point-of-use such that the formulated products are distributed to the point-of-use by a specified plan or sequence. The allocator may also be used to manage the formulation of chemical products such that the chemical products are formulated based on a plan or sequence. The chemical dispense system includes a communications system that enables system operators to control and monitor allocation and/or formulation operations from a remote location. A method for remotely monitoring and controlling operations of the chemical dispense system is also disclosed.

6 Claims, 10 Drawing Sheets

U.S. PATENT DOCUMENTS

| | | | |
|---|---|---|---|
| 4,241,400 A | 12/1980 | Kiefer | |
| 4,247,396 A | 1/1981 | Buesing | |
| 4,509,543 A | 4/1985 | Livingston et al. | |
| 4,690,305 A | 9/1987 | Copeland | |
| 4,756,321 A | 7/1988 | Livingston et al. | |
| 4,766,548 A | 8/1988 | Cedrone et al. | 364/479 |
| 4,848,381 A | 7/1989 | Livingston et al. | |
| 4,858,449 A | 8/1989 | Lehn | |
| 4,867,196 A | 9/1989 | Zetena et al. | |
| 4,908,190 A | 3/1990 | Maglio et al. | |
| 4,964,185 A | 10/1990 | Lehn | |
| 4,976,137 A | 12/1990 | Decker et al. | 73/53 |
| 4,999,124 A | 3/1991 | Copeland | |
| 5,014,211 A * | 5/1991 | Turner et al. | 700/239 |
| 5,038,807 A | 8/1991 | Bailey et al. | |
| 5,053,206 A | 10/1991 | Maglio et al. | |
| 5,136,281 A | 8/1992 | Bonaquist | |
| 5,203,366 A | 4/1993 | Czeck et al. | 137/3 |
| 5,240,326 A | 8/1993 | Evanson | |
| 5,268,153 A | 12/1993 | Muller | |
| 5,279,448 A | 1/1994 | Hanlin et al. | |
| 5,322,571 A | 6/1994 | Plummer et al. | |
| 5,332,312 A | 7/1994 | Evanson | |
| 5,340,210 A * | 8/1994 | Patel et al. | 366/132 |
| 5,370,267 A | 12/1994 | Schroeder | |
| 5,389,344 A | 2/1995 | Copeland et al. | |
| 5,397,028 A | 3/1995 | Jesadanont | |
| 5,404,893 A | 4/1995 | Brady et al. | |
| 5,411,716 A | 5/1995 | Thomas et al. | |
| 5,427,748 A | 6/1995 | Wiedrich et al. | |
| 5,497,914 A | 3/1996 | Maltsis | |
| 5,505,915 A | 4/1996 | Copeland et al. | |
| 5,556,478 A | 9/1996 | Brady et al. | |
| 5,580,448 A | 12/1996 | Brandreth | |
| 5,584,079 A | 12/1996 | Wong et al. | |
| 5,608,643 A * | 3/1997 | Wichter et al. | 700/244 |
| 5,609,417 A | 3/1997 | Otte | |
| 5,625,659 A | 4/1997 | Sears | |
| 5,625,908 A | 5/1997 | Shaw | |
| 5,679,173 A | 10/1997 | Hartman | |
| 5,695,091 A | 12/1997 | Winings et al. | |
| 5,724,261 A | 3/1998 | Denny et al. | |
| 5,762,096 A | 6/1998 | Mirabile | |
| 5,769,536 A | 6/1998 | Kotylak | |
| 5,827,486 A | 10/1998 | Crossdale | |
| 5,851,291 A | 12/1998 | Poterala et al. | |
| 5,875,430 A | 2/1999 | Koether | |
| 5,887,975 A | 3/1999 | Mordaunt et al. | 366/152.1 |
| 5,897,671 A | 4/1999 | Newman et al. | |
| 5,902,749 A | 5/1999 | Lichtwardt et al. | |
| 5,941,418 A * | 8/1999 | Box et al. | 222/71 |
| 5,945,910 A | 8/1999 | Gorra | |
| 5,956,487 A | 9/1999 | Venkatraman et al. | |
| 5,967,202 A * | 10/1999 | Mullen et al. | 141/104 |
| 5,973,696 A | 10/1999 | Agranat et al. | |
| 5,974,345 A | 10/1999 | Buck et al. | |
| 6,003,070 A | 12/1999 | Frantz | |
| 6,029,286 A | 2/2000 | Funk | |
| 6,061,603 A * | 5/2000 | Papadopoulos et al. | 700/83 |
| 6,082,149 A | 7/2000 | Woods | |
| 6,093,574 A * | 7/2000 | Druyor-Sanchez et al. | 436/180 |
| 6,120,175 A | 9/2000 | Tewell | |
| 6,133,555 A | 10/2000 | Brenn | |
| 6,136,184 A | 10/2000 | King | |
| 6,330,499 B1 | 12/2001 | Chou et al. | |
| 6,343,251 B1 | 1/2002 | Herron et al. | |
| 6,356,205 B1 | 3/2002 | Salvo et al. | |
| 6,357,292 B1 | 3/2002 | Schultz et al. | |
| 6,554,162 B2 * | 4/2003 | Schell et al. | 222/64 |
| 6,854,026 B1 * | 2/2005 | Sexton et al. | 710/62 |
| 2001/0039501 A1 | 11/2001 | Crevel et al. | |
| 2001/0047214 A1 | 11/2001 | Cocking et al. | |
| 2001/0053939 A1 | 12/2001 | Crevel et al. | |
| 2001/0054038 A1 | 12/2001 | Crevel et al. | |

FOREIGN PATENT DOCUMENTS

| | | |
|---|---|---|
| DE | 2444199 | 3/1975 |
| DE | 19633713 | 2/1988 |
| DE | 4025624 | 2/1991 |
| DE | 19540608 | 5/1997 |
| DE | 19757679 | 7/1998 |
| DE | 19736982 | 8/1998 |
| EP | 59695 | 9/1982 |
| EP | 269435 | 6/1988 |
| EP | DD283081 | 10/1990 |
| EP | WO 98 09598 | 3/1998 |
| EP | 0 882 496 A2 | 12/1998 |
| EP | 0882496 A2 | 12/1998 |
| EP | 0995483 A1 | 4/2000 |
| HU | 41652 | 5/1987 |
| JP | 56076233 | 6/1981 |
| JP | 09032084 | 2/1997 |
| JP | 09032085 | 2/1997 |
| JP | 09041466 | 2/1997 |
| JP | 09057081 | 3/1997 |
| JP | 09195364 | 7/1997 |
| JP | 09277913 | 10/1997 |
| JP | 10124746 | 5/1998 |
| JP | 11286980 | 10/1999 |
| JP | 11299671 | 11/1999 |
| JP | 11330041 | 11/1999 |
| SU | 1691219 | 11/1991 |
| WO | WO 8302761 | 8/1983 |
| WO | WO 9315828 | 8/1993 |
| WO | WO 9739327 | 10/1997 |
| WO | WO 9842786 | 10/1998 |
| WO | WO 2000037770 | 6/2000 |
| WO | WO 2000053346 | 9/2000 |
| WO | WO 0075065 A2 | 12/2000 |
| WO | WO 01 21131 A2 | 3/2001 |
| WO | WO 0146016 A1 | 6/2001 |

\* cited by examiner

REMOTE ACCESS TO CHEMICAL DISPENSE SYSTEM

RELATED APPLICATIONS

This application claims benefit of priority of U. S. provisional application Serial No. 60/304,587, entitled "Flow-Based Chemical Dispense Control System," filed Jul. 10, 2001, and U.S. provisional application Serial No. 60/312,587, entitled "Fill Station And Application-Based Allocator And Formulator For A Chemical Dispense Control System," filed Aug. 15, 2001. This application is related to subject matter disclosed in U.S. patent application for an "FLOW-BASED CHEMICAL DISPENSE SYSTEM," Ser. No. 10/188,714, filed concurrently herewith, the subject matter of which is incorporated in this application by reference.

TECHNICAL FIELD

The invention relates generally to chemical dispense systems, and more particularly, to remotely controlling and monitoring operation of chemical dispense systems.

BACKGROUND OF THE INVENTION

Chemical products composed of various component chemical concentrates may be used to clean or sanitize food and beverage production equipment and all associated environmental surfaces in plants that produce food and beverage products. On-site formulation systems prepare such chemical products by combining one or more component chemical concentrates according to a specialized formula or plan. The chemical products are then dispensed to a dispense location, such as a jug or drum.

If a chemical product is dispensed into a drum, the chemical product may be stored in the drum for a predetermined period of time prior to use. An on-site allocation system later distributes the chemical product from the drum to a point-of-use according to a specified plan or sequence. For example, if a first chemical product is stored in a first drum and a second chemical product is stored in a second drum, the allocation system may control distribution of these chemical products such that the first chemical product and the second chemical product are dispensed from the drums to a point-of-use in a specified sequence. The on-site allocation system may also be coupled to the on-site formulation system to control formulation operations such that each chemical product is formulated according to a specified plan or sequence. For example, the allocation system may direct the formulation system to prepare a first chemical product for cleaning a utility device and immediately thereafter prepare a second chemical product for sanitizing the utility device.

On-site formulation systems and allocation systems are typically included as components to a chemical dispense system. A chemical dispense system may include both of these components or one and not the other. In this respect, a chemical dispense system including an allocator, and not a formulator, distributes pre-formulated chemical products stored in drums to a point-of-use. Similarly, a chemical dispense system that includes a formulator, and not an allocator, prepares chemical products, but is not responsible for distributing the products to a point-of-use.

Conventional chemical dispense systems formulate and allocate chemical products in response to instructions that are pre-stored locally on the chemical dispense systems. A service providing organization ("service provider") typically manages these and other operations of a chemical dispense systems for a customer. Employees of the service provider, such as field service technicians and/or account managers, which are collectively referred to herein as "system operators," must physically visit these chemical dispense systems in order to input new instructions or revise the instructions that are already stored on the system. Conventional chemical dispense systems also provide information associated with the volume of each chemical concentrate used by the system as well as the volume of each chemical product dispensed by the system. However, these volumetric measurements are only presented to system operators using a display device local to the system. Therefore, system operators must physically visit these systems to gather such information.

SUMMARY OF THE INVENTION

In accordance with the present invention, the above and other problems are solved by a communications system for monitoring and controlling a chemical dispense system from a remote location. In accordance with an embodiment, the chemical dispense system prepares, or formulates, a chemical product using one or more component chemical concentrates. In accordance with another embodiment, the chemical dispense system allocates formulated chemical products such that the formulated products are distributed to a point-of-use by a specified plan or sequence. The communications system enables system operators to control and monitor allocation and/or formulation operations from the remote location.

The communications system is connected via a network to a user communication module. System operators use the user communication module to input instruction files that direct the chemical dispense system to perform specified tasks. The system operators may be either a customer that has purchased or rented the chemical dispense system or a service providing company that maintains and services the system. The user communication module also enables the system operators to monitor operational and business related aspects of the chemical dispense system. In an embodiment, operational related aspects are associated with actual operation of the chemical dispense system and the component. Business related aspects are associated with the supply, demand and volume characteristics the chemical products dispensed by the system as well as the component chemical concentrates used to form that chemical products, including cost and invoice related characteristics.

In accordance with an embodiment, the chemical dispense system furthers include a human-machine interface (HMI) having a graphical user interface (GUI) for facilitating user interaction with the system. In this embodiment, instruction files are transferred via the communications system to the HMI. The communications system includes a universal communicator and a corporate server that exchange files over a conventional network connection. The system operators input instruction files to the corporate server through user communication modules. The instruction files are thereafter stored on the corporate server for subsequent transfer to the HMI. Account and device data is generated at the chemical dispense system and provided to the corporate server by the universal communicator. The data is thereafter stored on the corporate server for subsequent transfer to the user communication modules. The universal communicator is coupled to the HMI thereby providing two-way data transfer from the HMI/GUI to and from the corporate server.

Embodiments of the present invention may be implemented as a computer process, a computing system or as an article of manufacture such as a computer program storage product or computer readable media. The computer program storage product may be a computer storage media readable by a computer system and encoding a computer program of instructions for monitoring and controlling a chemical dispense system from a remote location. The computer program storage product may also be a propagated signal on a carrier readable by a computing system and encoding a computer program of instructions for executing a computer process.

A great utility of the invention is that system operators are enabled to oversee formulation and allocation operations of a chemical dispense system from a remote location. The present invention provides system operators the ability to control which chemical products are dispensed and in what sequence from a location other than the physical location where the chemical dispense system is located. The present invention also provides system operators the ability to monitor operational and business related aspects of the chemical dispense system from a remote location. These and various other features as well as advantages, which characterize the present invention, will be apparent from a reading of the following detailed description and a review of the associated drawings.

DETAILED DESCRIPTION

Figure 1:
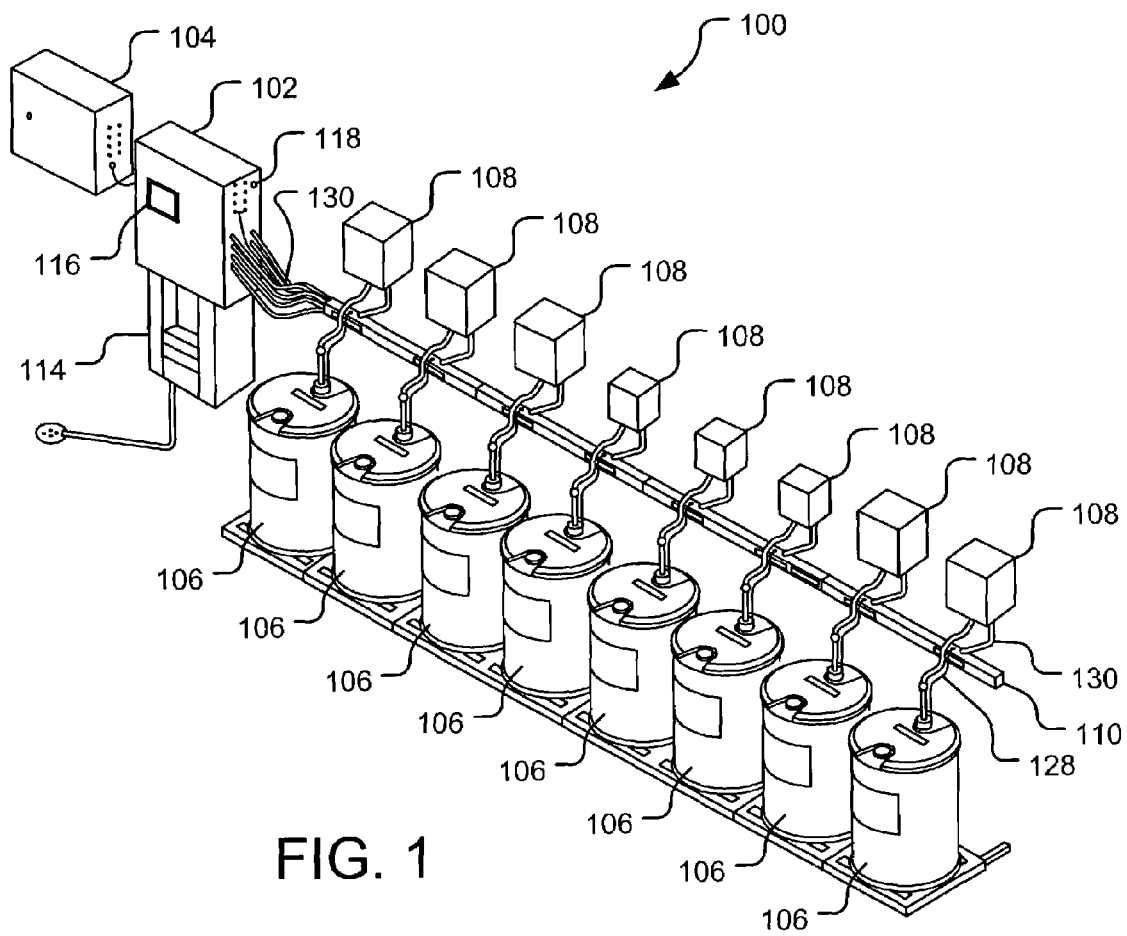
FIG. 1 is a functional diagram of a chemical dispense system in accordance with an embodiment of the present invention and the associated environment.

The present invention and its various embodiments are described in detail below with reference to the figures. When referring to the figures, like structures and elements shown throughout are indicated with like reference numerals.

Referring to FIG. 1, a conceptual illustration of an embodiment of the present invention is shown. FIG. 1 shows a chemical dispense system 100 for dispensing chemical concentrates to a dispense location (not shown in FIG. 1, 210 in FIG. 2), such as a jug or a drum. The chemical concentrates are combined at the dispense location to form a chemical product.

Although the dispense location is hereafter described as a storage location, the dispense location may be any container or reservoir operable to hold a chemical product. Moreover, the dispense location may be a point-of-use, which is a location where the chemical product may be used to accomplish a desired task, such as, without limitation, cleaning, filling, rinsing or otherwise utilizing. For example, a chemical product may be sprayed on a surface at a point-of-use.

The chemical dispense system 100 formulates, i.e., prepares according to a specialized formula, a chemical product using a plurality of component chemical concentrates. The chemical dispense system 100 dispenses the component chemical concentrates to the storage location to form a chemical product. The storage location may be defined as a drum, a jug, a tote or a bulk tank. If dispensed into a jug, the chemical product is thereafter stored for transfer to a point-of-use where the chemical product is used to perform a desired task. If dispensed into a drum, the chemical product is thereafter stored for allocation, i.e., distribution according to a specified plan, by an allocator 104.

In accordance with an embodiment, the allocator 104 may be programmed to distribute the chemical product to a particular point-of-use at a predetermined time or during a predetermined distribution sequence wherein a plurality of chemical products are distributed to the point-of-use. In accordance with yet another embodiment, the allocator 104 may also be programmed to distribute the chemical product to a jug at a predetermined time or during a particular sequence wherein a plurality of chemical products are distributed to a jug. In accordance with yet a further embodiment, the allocator 104 may also be used to manage the distribution of component chemical concentrates to a dispense location for formulation of a chemical product such that the chemical product is formulated based on a plan or sequence loaded into the allocator 104.

In accordance with an embodiment, the chemical dispense system 100 includes a formulator 102, concentrate pumps 108, and a fill station 114. The formulator 102 includes a human-machine interface (HMI) (not shown) through which a user may input instructions related to formulation of a specific chemical product. The HMI includes a graphical user interface (GUI), such as a touch-screen interface 116, operating on a Microsoft Windows CE™-based operating system. Other than the touch-screen interface 116, the HMI may include any other conventional GUI through which a user may input instructions for monitoring and/or controlling operations of the chemical dispense system 100. Based on user instructions, the formulator 102 formulates requested chemical products by combining water and/or one or more component chemical concentrates in a jug situated in the fill station 114. Water may be input to the formulator 102 through a water inlet 118. The term "chemical concentrate" refers to both water and all other chemical concentrates used by the formulator 102 in formulating a chemical product. As described above, rather than being combined in a jug, the component chemical concentrates may also be combined in a drum, tote or bulk tank.

Prior to being supplied to the formulator 102, the chemical concentrates are stored in concentrate containers 106. Because the chemical concentrates are ultimately used to form various chemical products, the term "component" chemical concentrate(s) is used herein to refer to one or more specific chemical concentrate(s) used by the chemical dispense system 100 to form a chemical product. The formulator 102 controls operation of the concentrate pumps 108, which extract the chemical concentrates stored in the concentrate containers 106 and supply pressure to push or pass the chemical concentrates through concentrate conduits 130 to a manifold (not shown in FIG. 1; 212 in FIG. 3) located inside the formulator 102. More specifically, based on user instructions, the formulator 102 selects one or more concentrate pumps 108, one at a time in a preprogrammed sequence, for activation in accordance with an embodiment of the present invention. Alternatively, the formulator 102 may activate multiple concentrate pumps 108 in a substantially simultaneous manner such that multiple concentrates may be provided to the manifold during a given time period.

Each concentrate pump 108 is associated with a specific chemical concentrate stored in a specific concentrate container 106. Each concentrate pump 108 is attached to an associated concentrate container 106 via a container-pump connection 128. The container-pump connection shown in FIG. 1 as a pipe 128 may be any form of pipe, conduit or hose.

Upon activation to supply a stored chemical concentrate to the manifold, the concentrate pump 108 transfers the chemical concentrate from the concentrate container 106 to the pump 108 through the pipe 128. The pump 108 funnels each chemical concentrate from the pipe 128 to the manifold via a pump-manifold connection 130, which may be any form of pipe, conduit or hose. In accordance with an embodiment, the manifold connects to eight pump-manifold connections 130, and thus, eight different chemical concentrates may be supplied to the manifold in turn. Alternatively, the manifold may connect to any number of pump-manifold connections 130, and thus, receive any number of concentrates in turn. For clarity, the pump-manifold connection 130 is hereinafter referred to as a "concentrate conduit."

Chemical concentrates are discharged from the formulator 102 to the dispense location through the manifold. A dispense hose (not shown in FIG. 1; 218 in FIG. 3) for directing the chemical concentrates from the formulator 102 to the dispense location may be operably connected to an output of the manifold. In accordance with an embodiment, a flow meter (not shown in FIG. 1; 202 in FIG. 3) is coupled between the output of the manifold and the dispense hose. The flow meter measures the volume of flow of each chemical concentrate used to form a particular chemical product through the dispense hose. With this information, the chemical dispense system 100 monitors and controls various dispensing aspects of each component chemical concentrate, such as, but not limited to, the flow rate of each component chemical concentrate between the manifold and the dispense hose and the percentage of each component chemical concentrate of which the chemical product is composed. In addition, the flow meter provides means for detecting fault with the various mechanical parts of the chemical dispense system 100 if the expected chemical product is not being properly formulated. The flow meter is described in greater detail with respect to FIG. 3.

In accordance with an embodiment, the lower portion of the formulator 102 may be coupled to the fill station 114. The fill station 114 is sized to include a jug for receiving the chemical concentrates as the concentrates are dispensed from the formulator 102 to the fill station 114. As such, the dispense hose protrudes into the jug. The jug may be any size, but in accordance with various embodiments, is a 1.5-gallon jug, a 2.5-gallon jug or a 5-gallon jug. A second dispense hose (not shown) may be affixed to a second output of the formulator 102 in accordance with an embodiment of the present invention. The second dispense hose may be used to fill drums with specific chemical products formulated by the formulator 102. Alternatively, the formulator 102 may have only a single dispense hose, as described above, wherein the dispense hose may be positioned to fill either a jug situated in the filling station 114 or a drum with a specific chemical product.

In accordance with an embodiment, a customer purchases or rents the chemical dispense system 100 from a service provider that maintains and services the chemical dispense system 100 for the customer. The service provider may also provide component chemical concentrates used in forming chemical products for the customer. As the volume of needed chemical concentrates runs low, the service provider is responsible for replenishing the chemical concentrates in the system 100. In accordance with an embodiment, the service provider charges the customer based on the volume of chemical products formulated or allocated by the chemical dispense system 100. Alternatively, the service provider may charge the customer based on the volume of chemical concentrates used by the chemical dispense system 100 to formulate chemical products.

Figure 2:
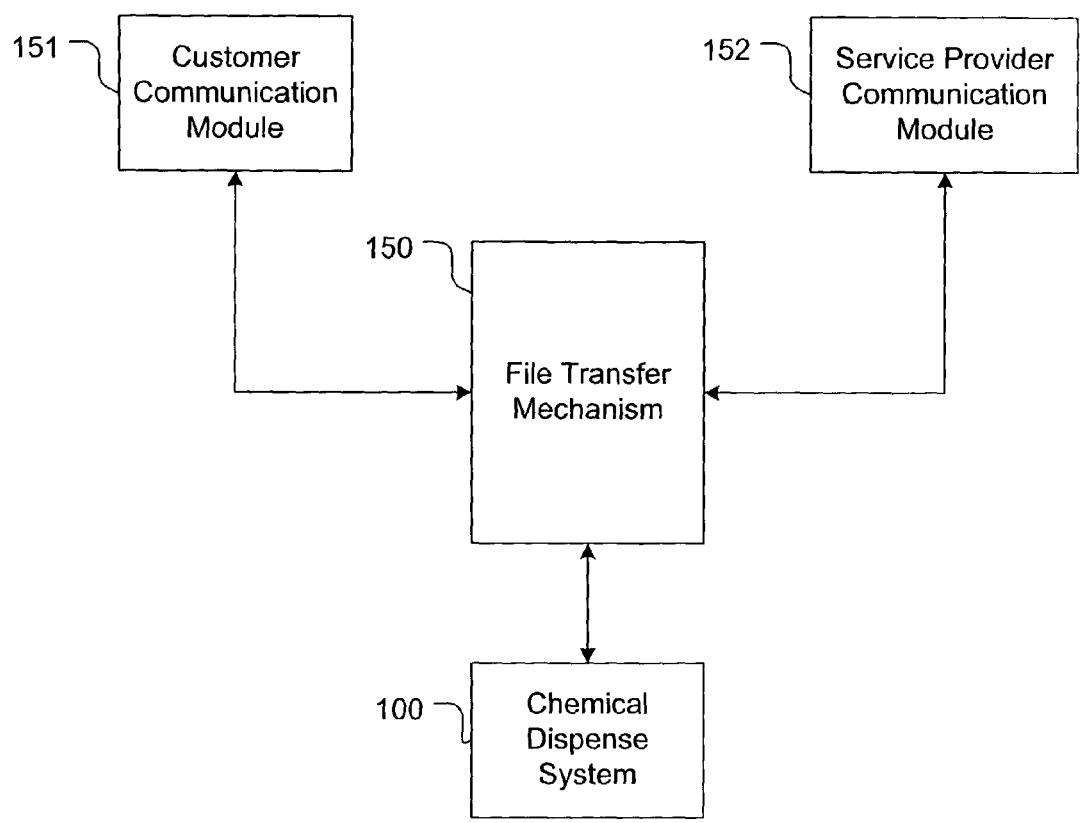
FIG. 2 is a block diagram that illustrates a communications system for remotely accessing the chemical dispense system of FIG. 1 in accordance with an embodiment of the present invention.

FIG. 2 illustrates a communications system 150 for controlling and monitoring operations of the chemical dispense system 100 in accordance with an embodiment of the present invention. The communications system 150 enables both the customer and the service provider to control and monitor operations of the chemical dispense system 100 from a remote location. The communications system 150, hereinafter referred to as a "file transfer mechanism," is connected between the chemical dispense system 100 and two separate user communication modules—one for the customer and the other for the service provider.

The file transfer mechanism 150 is coupled between the chemical dispense system 100 and a service provider communication module 152. The service provider communication module 152 is used by the service provider to control and monitor operations of the chemical dispense system 100 from a remote location. In accordance with an embodiment, the service provider communications module 152 is a conventional computing system having a network connection and at least one application program ("service provider application program") associated with the chemical dispense system 100. Other types of systems operable to provide communication between the service provider and the file transfer mechanism 150 may also be used in accordance with an alternative embodiment. The service provider application program (1) presents information associated with operation of the chemical dispense system 100 and (2) enables the service provider to input instructions for controlling the chemical dispense system 100.

The service provider application program includes a graphical user interface displayed on a display device of the service provider communications module 152. The graphical user interface enables the service provider to monitor various operational and business related aspects of the chemical dispense system 100, such as, without limitation, the volume of each chemical concentrate used by the system 100, the volume of each chemical product formulated or allocated by the system 100, the sequence in which chemical products are being formulated or allocated, and whether the system 100 is operating properly. The instructions input by the service provider through the graphical user interface of the service provider application program may relate to any type of control operation for the chemical dispense system. For instance, the instruction may define an application for the chemical dispense system 100. An application is an instruction to formulate or allocate one or more chemical products at a particular time. The application may define a sequence in which the chemical dispense system 100 formulates or allocates multiple chemical products at the instructed time.

The file transfer mechanism 150 is also coupled between the chemical dispense system 100 and a customer communication module 151. The customer communication module 151 is similar to the service provider communication module 152 in that the customer communication module 151 is used by the customer to remotely control and monitor operations of the chemical dispense system 100. However, the customer is only provided limited control over the chemical dispense system 100. Whereas the service provider may serve as an administrator and thus control and monitor all aspects of system operation, the customer may only control and monitor those aspects as defined by the service provider. These limited aspects may be set forth between the service provider and the customer is an agreement between the two parties. In accordance with an embodiment, the customer communication module 151 is a conventional computing system having a network connection and at least one application program ("customer application program") associated with the chemical dispense system 100. Other types of systems operable to provide communication between the customer and the file transfer mechanism 150 may also be used in accordance with an alternative embodiment.

The customer application program is substantially similar to the service provider application program described in the preceding paragraph with the exception that the customer application program only allows the customer to control and monitor those aspects of system operation as defined by the service provider. In accordance with an embodiment, the customer may be given access to utilize the customer application program to define an application for the chemical dispense system 100. In accordance with another embodiment, the customer is also given access to utilize the customer application program to monitor the volume of concentrates used by the chemical dispense system 100, the volume of chemical products formulated or allocated by the system 100, the time at which chemical products were formulated or allocated, and the balance due to the service provider based on the volume of concentrates used or chemical products dispensed, i.e., formulated or allocated.

The file transfer mechanism 150 receives instructions from the customer communication module 151 and the service provider communication module 152 over a conventional telecommunications network, such as, without limitation a wide area network, a local area network or the Internet. The file transfer mechanism 150 then forwards these instructions to the chemical dispense system 100. Upon receipt of the instructions, the chemical dispense system 100 processes the instructions for performance of the tasks contained therein. For instance, if a received instruction defines an application for the chemical dispense system 100, the system 100 will initiate formulation or allocation of the one or more chemical products specified in the application.

The file transfer mechanism 150 receives data from the chemical dispense system 100 over a conventional telecommunications network, such as, without limitation a wide area network, a local area network or the Internet. The data may be device data, account data or chemical data. Device data is any type of data related to operational aspects of the chemical dispense system 100. For instance, device data may include data that identifies whether a component of the chemical dispense system 100 is working improperly. In accordance with an embodiment, account data is data related to business or demand/supply aspects of the chemical dispense system 100. Account data may therefore include information associated with ancillary aspects of chemical dispensing operations, such as, without limitation, concentrate supply/demand, per-use characteristics, concentrate use relative to a given period of time, chemical product supply/demand and chemical product dispensing, i.e., formulation or allocation, relative to a given period of time. For instance, account data may include data that identifies the volume of chemical concentrates used or chemical products formulated/allocated by the chemical dispense system 100 over a given period of time. In accordance with an embodiment, chemical data is data used by the chemical dispense system 100 to control formulation operations as component concentrates are being provided to the dispense location 210 from concentrate containers 106 via concentrate pumps 108. The file transfer mechanism 150 forwards the received device, account and/or chemical data to the appropriate recipient, i.e., either the customer communication module 151 or the service provider communication module 152, or both.

Figure 3:
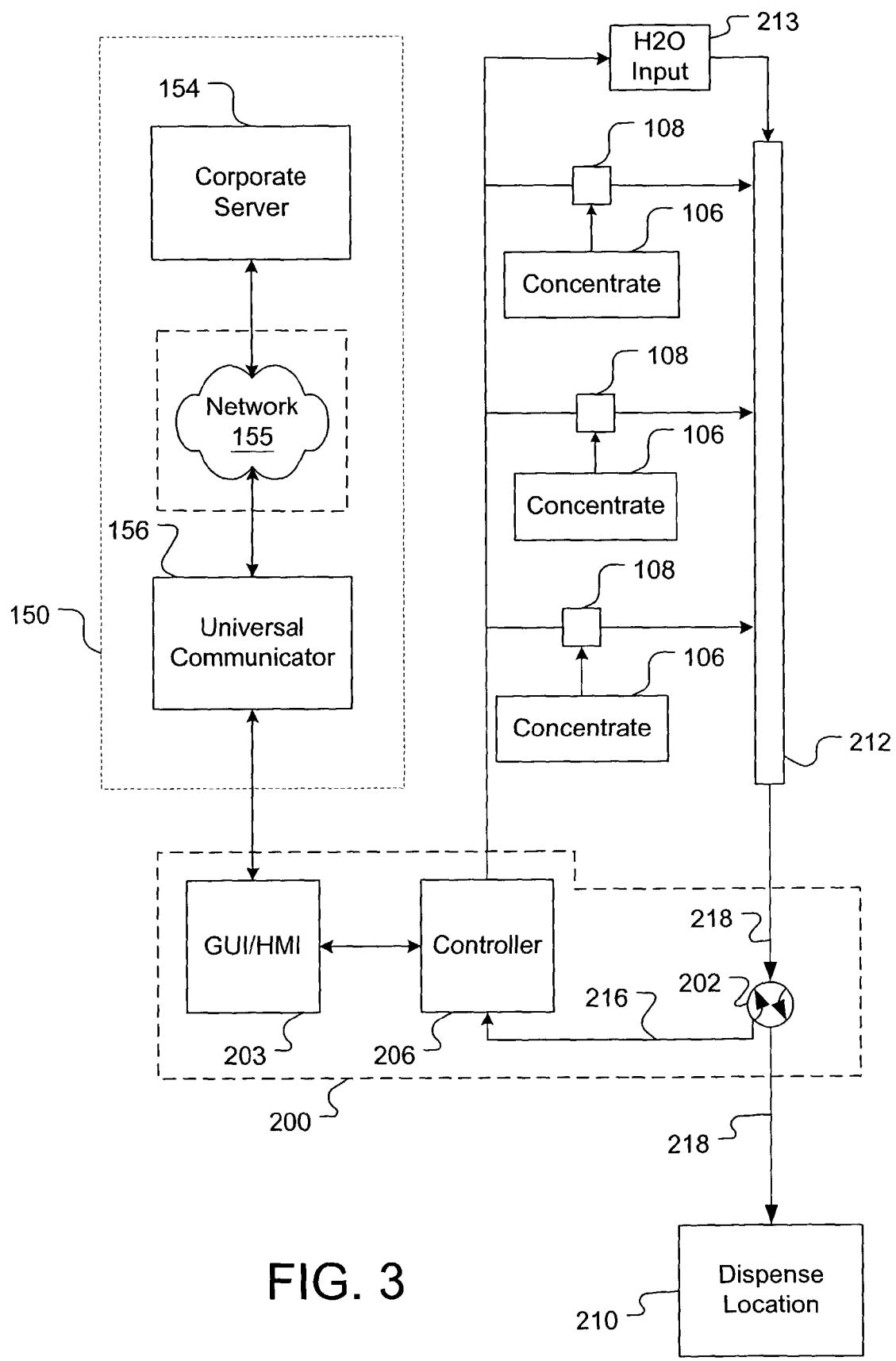
FIG. 3 is a simplified block diagram that illustrates functional components of the chemical dispense system shown in FIG. 1.

Referring now to FIG. 3, a dispense control system 200 for controlling operations of the chemical dispense system 100 is shown in accordance with an embodiment of the present invention. The dispense control system 200 includes a flow meter 202, a controller 206 and an HMI 203. The controller 206 may be, for example, a PLC or any CPU-based controller. The flow meter 202 detects the flow volume of each chemical concentrate that flows through the flow meter 202 and provides sensed volumetric information to the controller 206.

Generally, a flow meter, such as 202, is a device for measuring flow in any pipe, conduit or hose. A typical flow meter consists of a propeller mounted in a short section of pipe and geared to a revolution counter that provides feedback to the CPU controller. The revolution counter counts revolutions of the turning propeller as one or more chemical concentrates pass through the meter 202. The flow meter 202 then generates a pulse for each turn of the propeller. These pulses are input to a high-speed counter of the controller 206. The controller 206 utilizes the counter to determine the flow in Gallons or Cubic Feet from the received pulses. The controller 206 calculates volume of each concentrate based on the number of pulses the controller 206 receives from the feedback control loop 216. Although the flow meter 202 is described herein as a positive displacement/propeller meter, other types of flow meters may be used without departing from the essence of the present invention. Examples of other types of flow meters include, without limitation a vortex-based flow meter, a magnetic-based flow meter, an electro-magnetic-based flow meter, a paddle wheel-based flow meter, a coriolis mass-based flow meter and a turbine-based flow meter.

Because the various component concentrates for each chemical product each have different specific gravities, the flow meter 202 is calibrated for each component concentrate. In calibrating the flow meter 202, a given volume of each component concentrate is dispensed through the meter 202. Flow of this given volume generates pulses that are transmitted to the controller 206. After a predetermined number of pulses corresponding to the volume of the component concentrate has been received by the controller 206, flow of the component concentrate is stopped. The volume of concentrate received is then compared to the volume of concentrate expected, the difference of which renders a flow, or calibration, factor (K-factor) for the component concentrate. The flow factor is used during formulation operations to adjust the number of expected flow pulses so that the volume of the component concentrate required to formulate the chemical product equals the amount of that component concentrate dispensed to the dispense location 210.

Chemical concentrates flow through the flow meter 202 and are dispensed to a dispense location 210 via a dispense hose 218. The chemical product is formed once all concentrates have exited the hose 218 at the dispense location 210. In accordance with an embodiment, the dispense location 210 may be a jug situated in a fill station 114, as shown and described with reference to FIG. 1, or a drum (not shown). Alternatively, the chemical dispense system 100 may dispense the chemical concentrates directly to a point-of-use. Under such circumstances, the chemical concentrators are fed via the dispense hose 218 such that the concentrates exit the hose 218 and are provided directly to the point-of use.

A point-of-use may be defined as a physical location where a chemical product is to be formed, or if already formulated, then dispensed. For example, a point-of-use may be a utility device, wherein the chemical concentrates are dispensed in turn to clean the device or components of the device. Thus, the chemical product is considered "formed" on the device. In accordance with one embodiment, the point-of-use may be associated with a food production and/or packaging process and the formulated chemical product may be used to sanitize the food as the food is passing through the production and/or packaging process. Additionally, the point-of-use may be associated with a production and/or packaging process related to manufacture and/or packaging of any tangible good or product. In accordance with still other embodiments, the point-of-use may be associated with an industrial device requiring chemical and/or fluid input, such as a ware-washer, a laundry machine, a vending machine, a keg regulator or any other industrial device of which chemical/fluid flow and insertion is regulated.

Each concentrate pump 108 is operably connected to a chemical concentrate container 106 and is responsible for extracting the chemical concentrate from the container 106 and providing the concentrate to a manifold 212 located inside the formulator 102. In accordance with an embodiment, each respective chemical concentrate is supplied to the formulator 102 via concentrate conduits 130 that are coupled to the manifold 212. The concentrates exit the manifold 212 and flow through the flow meter 202 en route to the dispense location 210 via the dispense hose 218. The flow meter 202 measures a volume of each chemical concentrate that flows between the manifold 212 and the dispense hose 218. This measured volumetric information is provided to the controller 206 through a feedback control loop 216. The controller 206 uses this information to regulate the volumetric flow of chemical concentrates into the manifold 212, thereby controlling formulation of each chemical product dispensed by the system 100.

As noted above, formulated chemical products are made up of a set of component concentrates. The specific gravity of the formulate chemical product and the percent weight of the component concentrates required to formulate the chemical product are used to dispense the appropriate volume of each component concentrate to the dispense location 210. After the flow meter 202 has been calibrated for each component used to formulate a specific chemical product, the volume of each component concentrate passed through the flow meter 202 is monitored by the controller 206 to control, i.e., maintain, increase, decrease or stop, the flow of the component concentrate based on a predetermined volume as required for the formulated chemical product.

In accordance with an embodiment, the measured volumetric information is stored in a production log, thereby providing proof of delivery not only for the chemical product, but also for each respective chemical concentrate used in forming the product. The controller 206 may also use the measured information to control other aspects related to chemical product formulation at the dispense location 210. For example, without limitation, the dispense control system 200 may use the measured information to monitor and control the velocity of component chemical concentrates through the dispense hose 218. Further, the dispense control system 200 may also use the measured information to monitor inventory levels of the chemical concentrates. When the inventory levels are low, a notification for inventory replenishment is generated which instructs authorized users or an inventory management system that replenishment of a particular chemical concentrate may be needed.

The chemical dispense system 100 may be controlled and monitored by a customer and a service provider accessing the system 100 from a remote location in accordance with an embodiment of the present invention. To allow the transfer of files to and from the chemical dispense system 100, the dispense control system 200 is coupled, either directly or indirectly, to the file transfer mechanism 150. The file transfer mechanism 150 includes a universal communicator 156 and a corporate server 154. The universal communicator 156 and the corporate server 154 communicate over a telecommunications network 155, such as, without limitation a wide area network, a local area network or the Internet.

The universal communicator 156 is designed to allow an authorized user to communicate with the HMI 203 through the corporate server 154 such that an authorized user can remotely define chemical applications, user access rights and rules, and other system-related functions for control of the chemical dispense system 100. These functions are defined via the Internet or other network 155, and transmitted through the universal communicator 156 to the dispense control system 100. The universal communicator 156 passes data to and receives data from a corporate server 154 via the network 155. The connection to the network 155 may be established through a modem, a local area network, a wireless network or any other means for connecting to a remote computer.

In accordance with an embodiment, the controller 206 may be a PLC (programmable logic controller) operable to provide hardened I/O (inputs/outputs) for the dispense control system 200. The HMI 203, which provides user control over the chemical dispense system 100, includes a touch screen interface based on the Windows CE™ operating system in accordance with an embodiment of the present invention. The HMI/GUI 203 may communicate to/from the PLC 206 via data tag sharing and manipulation.

The corporate server 154, which resides at a remote location with respect to the site of the HMI 203 and the controller 206, includes a web-based server application program in accordance with an embodiment of the present invention. Initially, the web-based server application program allows a user to set up his/her system, i.e. configure formulation; create user IDs and Passwords; create applications that are specific for the user's system, etc. When the setup is finished for the user, the web-based server application program will save the information entered into various files, and store such information on the corporate server 154. The files are downloaded onto the controller 206 once the controller 206 contacts the server 154. The files populate the controller 206 with instructions related to specific chemical products that may be formulated by the user's system 100.

As component chemical concentrates are dispensed to the dispense location 210, the controller 206 uses a high-speed counter to monitor flow of the component concentrates through the flow meter 202. Information associated with flow of the component concentrates through the flow meter 202 is used by the controller 206 to control formulation of the chemical product and provide the HMI 203 with information associated with the chemical product being formulated. The user can access this information using the HMI 203.

The HMI 203 stores every function performed and/or occurred on it to a log file. The log file is sent daily to the corporate server 154 via the universal communicator 156. At the same time that the log file is sent to the corporate server 154, the universal communicator 156 downloads the setup file for the system 100 stored on the server 154 thereby retrieving the updated files in order to update formulation, user or dispense application information accordingly.

Figure 4:
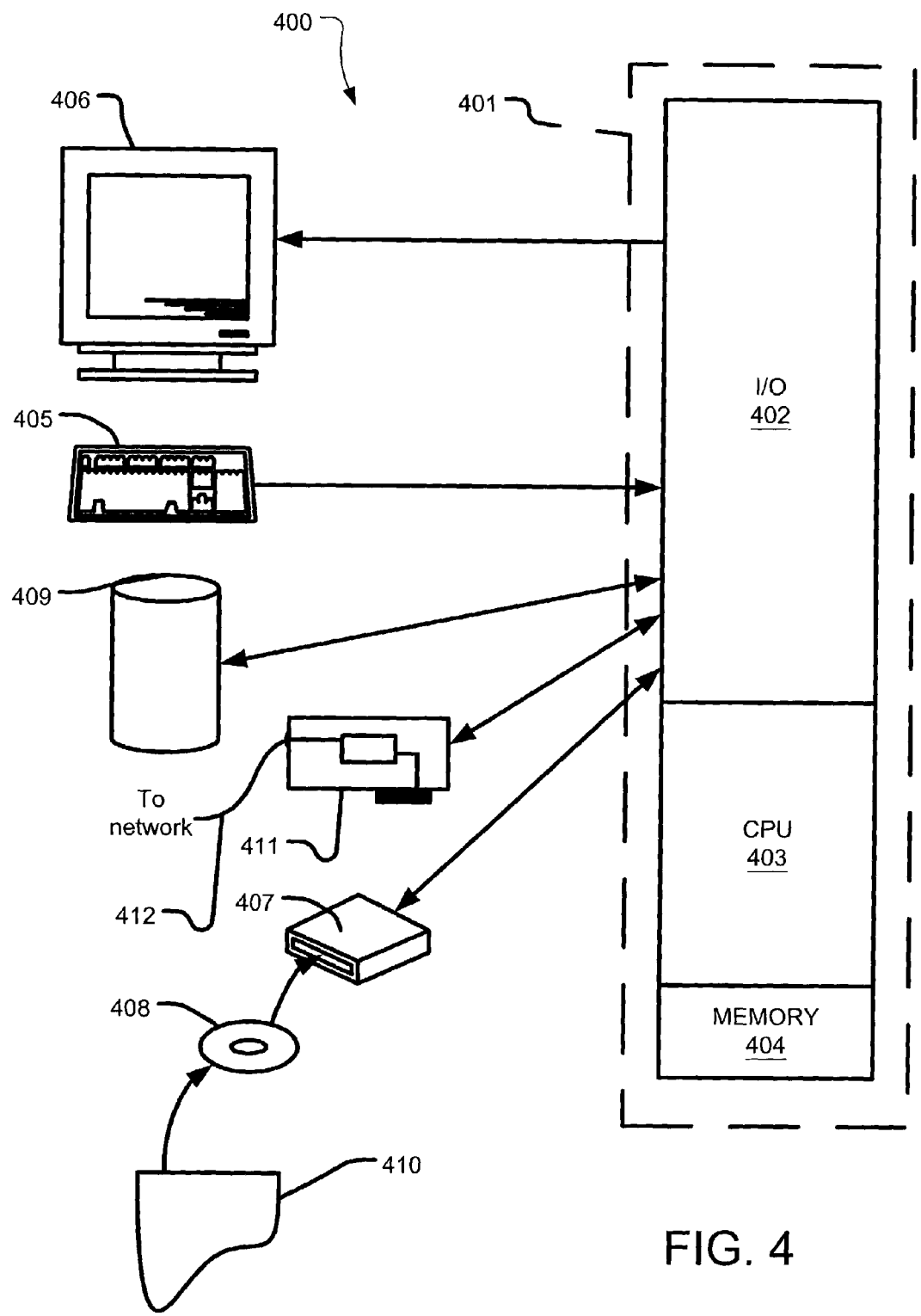
FIG. 4 depicts a block diagram of a suitable computing environment in which an embodiment of the present invention may be implemented.

In accordance with one embodiment, the dispense control system 200 is implemented as a computing system including at least some form of computer program storage or communication medium readable by a computing system and encoding a computer program for monitoring and controlling a chemical dispense system from a remote location. FIG. 4 and the following discussion is intended to provide a brief, general description of a suitable computing environment in which an embodiment of the present invention may be implemented. Although not required, embodiments of the present invention will be described in the general context of computer-executable instructions, such as program modules, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced-in concurrent, multi-tasking computing environments wherein tasks are performed by remote processing devices that are linked through a communications network. In concurrent, multi-tasking computing environments, program modules may reside in both local and remote memory storage devices.

FIG. 4 depicts a general-purpose computing system 400 capable of executing a program product embodiment of the present invention. One operating environment in which the present invention is potentially useful encompasses the general-purpose computing system 400. In such a system, data and program files may be input to the computing system 400, which reads the files and executes the programs therein. Some of the elements of a general-purpose computing system 400 are shown in FIG. 4 wherein a processor 401 is shown having an input/output (I/O) section 402, a Central Processing Unit (CPU) 403, and a memory section 404. The present invention is optionally implemented in software devices loaded in memory 404 and/or stored on a configured CD-ROM 408 or storage unit 409 thereby transforming the computing system 400 to a special purpose machine for implementing the present invention.

The I/O section 402 is connected to a keyboard 405, a display unit 406, a disk storage unit 409, and a disk drive unit 407. In accordance with one embodiment, the disk drive unit 407 is a CD-ROM driver unit capable of reading the CD-ROM medium 408, which typically contains programs 410 and data. Computer program products containing mechanisms to effectuate the systems and methods in accordance with the present invention may reside in the memory section 404, the disk storage unit 409, or the CD-ROM medium 408 of such a system. In accordance with an alternative embodiment, the disk drive unit 407 may be replaced or supplemented by a floppy drive unit, a tape drive unit, or other storage medium drive unit. A network adapter 411 is capable of connecting the computing system 400 to a network of remote computers via a network link 412. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 400. Logical connections may include a local area network (LAN) or a wide area network (WAN). Such networking environments are commonplace in offices, enterprise-wide computer networks, intranets, and the Internet.

In accordance with a program product embodiment of the present invention, software instructions, such as instructions directed toward communicating data between a client and a server, detecting product usage data, analyzing data, and generating reports, may be executed by the CPU 403; and data, such as products usage data, corporate data, and supplemental data generated from product usage data or input from other sources, may be stored in memory section 404, or on the disk storage unit 409, the disk drive unit 407 or other storage medium units coupled to the system 400.

As is familiar to those skilled in the art, the computing system 400 further comprises an operating system and usually one or more application programs. The operating system comprises a set of programs that control operations of the computing system 400 and allocation of resources. the set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system may employ a graphical user interface wherein the display output of an application program is presented in a rectangular area on the screen of the display device 406. The operating system is operable to multitask, i.e., execute computing tasks in multiple threads, and thus may be any of the following: Microsoft Corporation's "WINDOWS 95," "WINDOWS CE," "WINDOWS 98," "WINDOWS 4000" or "WINDOWS NT" operating systems, IBM's OS/2 WARP, Apple's MACINTOSH SYSTEM 8 operating system, X-windows, etc.

In accordance with the practices of persons skilled in the art of computer programming, embodiments of the present invention is described below with reference to acts and symbolic representations of operations that are performed by the computing system 400, a separate storage controller or a separate tape drive (not shown), unless indicated otherwise. Such acts and operations are sometimes referred to as being computer-executed. It will be appreciated that the acts and symbolically represented operations include the manipulations by the CPU 403 of electrical signals representing data bits causing a transformation or reduction of the electrical signal representation, and the maintenance of data bits at memory locations in the memory 404, the configured CD-ROM 408 or the storage unit 409 to thereby reconfigure or otherwise alter the operation of the computing system 400, as well as other processing signals. The memory locations where data bits are maintained are physical locations that have particular electrical, magnetic, or optical properties corresponding to the data bits.

The logical operations of various embodiments of the present invention may be implemented (1) as a sequence of computer-implemented steps running on a computing system 400 and/or (2) as interconnected machine modules within the computing system 400. The implementation is a matter of choice dependent on the performance requirements of the computing system 400 implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
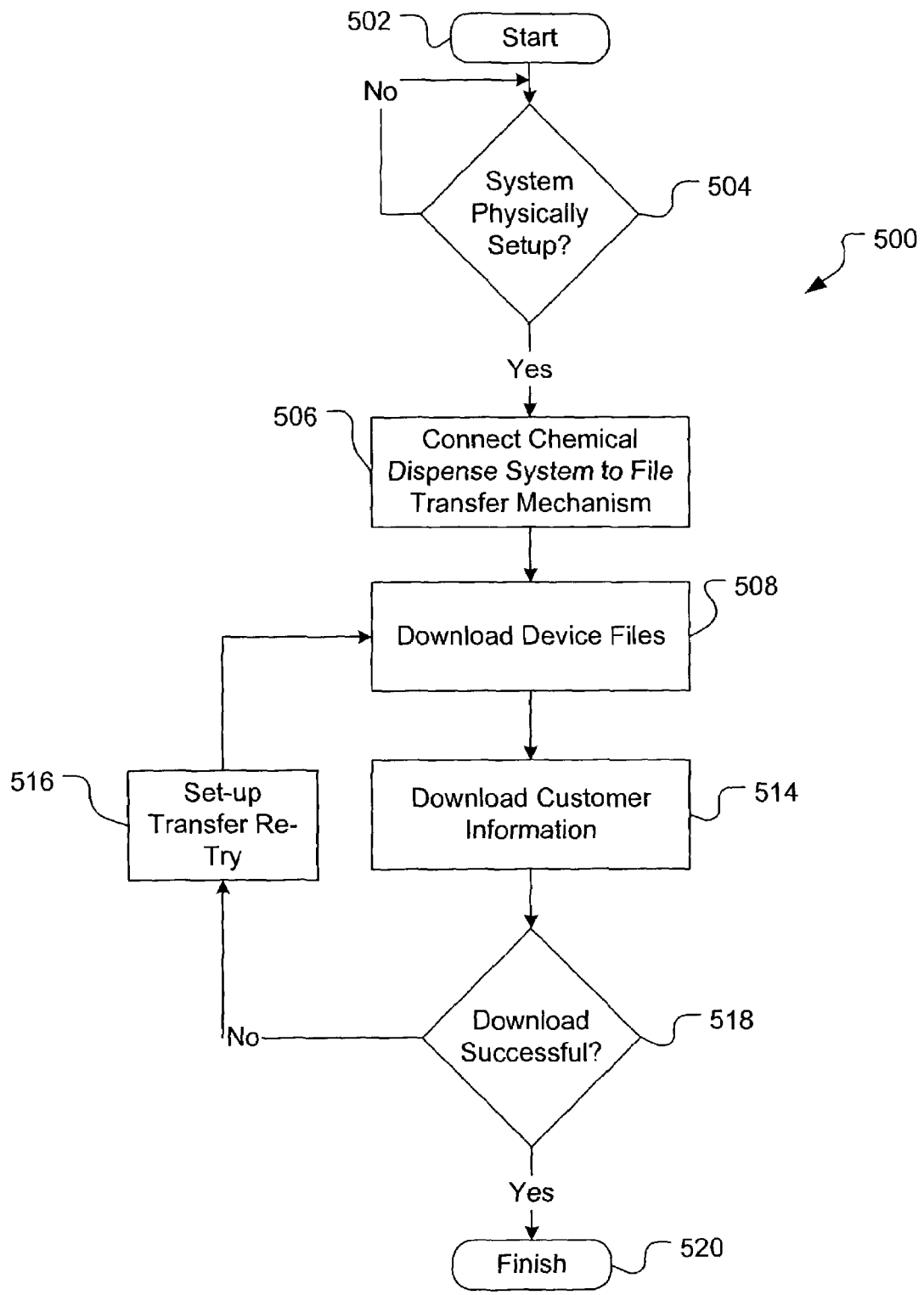
FIG. 5 is a flow diagram that illustrates operational characteristics for installing and initializing the chemical dispense system of FIG. 1 in accordance with an embodiment of the present invention.

Referring now to FIG. 5, an installation process 500 generally illustrating operations for installing a chemical dispense system 100 is shown in accordance with an embodiment of the present invention. The installation process 500 is performed by an operation flow beginning with a start operation 502 and concluding with a termination operation 520. In accordance with an embodiment of the present invention, the operations of the installation process 500 are executed by software stored in the 14MI 203. The start operation 502 begins as the chemical dispense system 100 is purchased or rented by the customer from a service provider. In accordance with an embodiment, the service provider may be responsible for maintaining and servicing the chemical dispense system 100 as well as providing chemical concentrates to be used by the system 100 to formulate or allocate certain chemical products. From the start operation 502, the operation flow passes to a physical setup query operation 504.

The physical setup query operation 504 awaits indication that the chemical dispense system 100 is set up at an intended physical location. In accordance with an embodiment, the intended physical location is operated by the customer. Installation personnel, typically employees of the service provider, indicate that the chemical dispense system 100 is indeed set up at the intended physical location by selecting the appropriate controls on the touch-screen interface (GUI) 116. After the chemical dispense system 100 is set up at the intended physical location, the operation flow passes to a file access operation 506.

The file access operation 506 operably connects the chemical dispense system 100 to the file transfer mechanism 150. In accordance with an embodiment, a universal communicator 156 is one component of the chemical dispense system 100 coupled to the HMI 203. The universal communicator 156 makes up the portion of the file transfer mechanism 150 that receives information from the corporate server 154 and thereafter forwards the information to the HMI 203. The universal communicator 156 also receives account, chemical and device data sent from the HMI 203 and thereafter forwards such data to a corporate server 154. The file access operation 506 connects the universal communicator 156 to the corporate server 154 using a connection to the network 155. Once connected, files may be exchanged between these two components of the file transfer mechanism 150. From the file access operation 506, the operation flow passes to a first download operation 508.

The first download operation 508 downloads the files required to initialize the chemical dispense system 100 from the corporate server 154 to the HMI 203. The first download operation 508 uses the universal communicator 156 to administer this task in accordance with an embodiment of the present invention. These initialization files include, without limitation, software to be stored locally to the HMI 203 to provide the touch-screen interface (GUI) 116, the control specifications and software needed for operation of the system 100, operating specifications for the system 100, and any other software that may be needed to control and monitor the chemical dispense system 100 from both a remote location as well as the location where the system 100 is physically located. From the first download operation 508, the operation flow passes to a second download operation 514.

The second download operation 514 downloads files required to assign the chemical dispense system 100 to the appropriate customer such that the customer may access the system 100 from remote locations and the service provider may monitor account data transmitted by the system 100 and manage business services based on this data. The second download operation 514 downloads customer-specific information from the corporate server 154 to the HMI 203. The second download operation 514 uses the universal communicator 156 to administer this task in accordance with an embodiment of the present invention. From the second download operation 514, the operation flow passes to a download success query operation 518. In accordance with an alternative embodiment, the information downloaded by the first download operation 508 and the second download operation 514 may be downloaded using a single operation, rather than using separate operations as shown in FIG. 5.

The download success query operation 518 checks whether all files necessary for assignment of the chemical dispense system 100 to the appropriate customer were downloaded to the HMI 203. If the download success query operation 518 determines that an error occurred during download and all necessary files were not transferred from the server 154 to the universal communicator 156, and then forwarded from the universal communicator 156 to the HMI 203, the operation flow passes to a re-try operation 516. The re-try operation 516 initiates a re-try of the first download operation 508 and the second download operation 514, from which the operation flow continues as previously described. Indeed, the operation flow will continue passing back to the second download operation 514 until a successful download is identified by the download success query operation 518.

Once the download success query operation 518 identifies a successful download, the operation flow concludes at the terminate operation 520.

Figure 6:
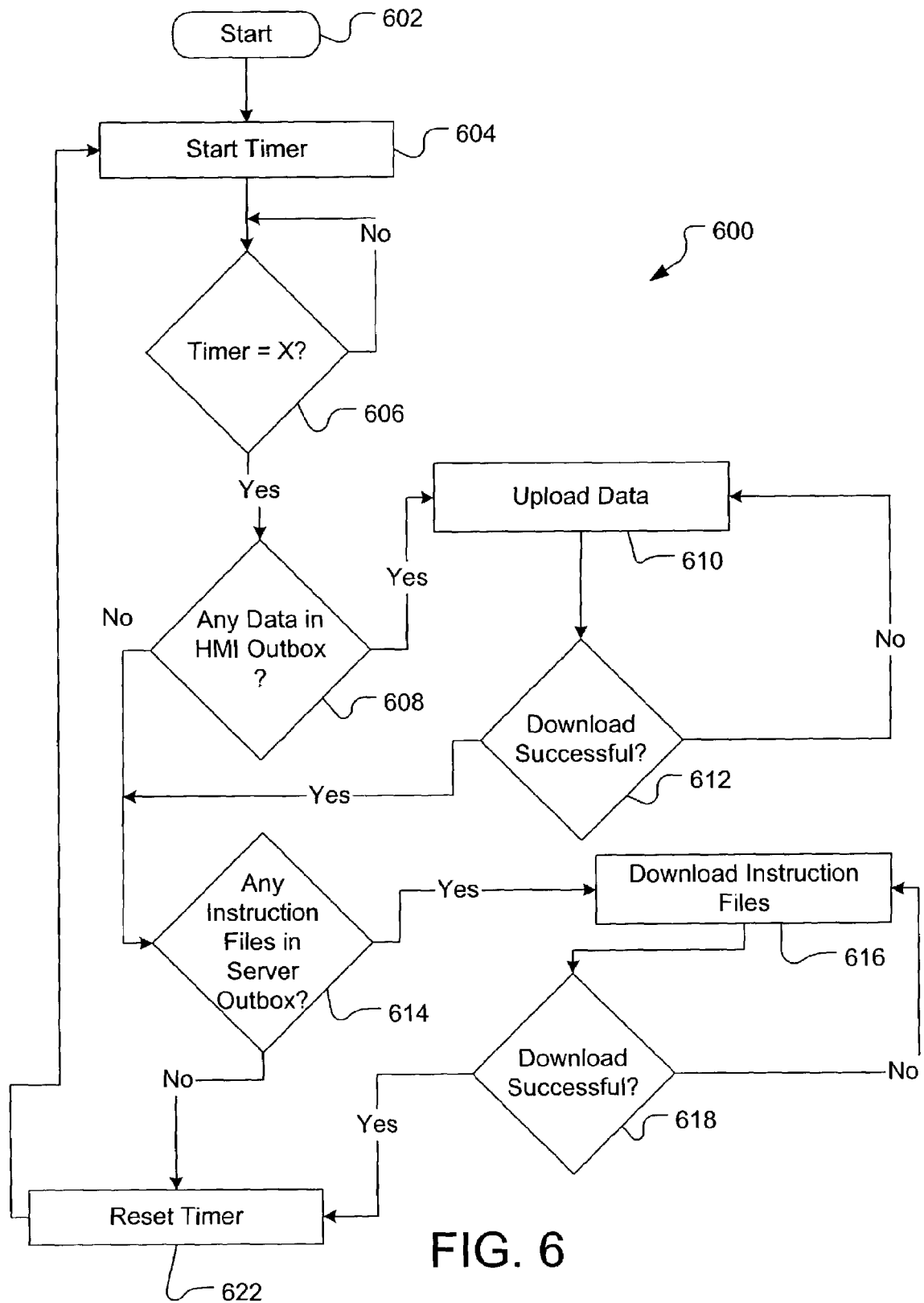
FIG. 6 is a flow diagram that illustrates operational characteristics for transferring files between the chemical dispense system of FIG. 1 and the communications system of FIG. 2 in accordance with an embodiment of the present invention.

FIG. 6 shows a file transfer process 600 illustrating automated file transfer between the chemical dispense system 100 and the corporate server 154 in accordance with an embodiment of the present invention. The file transfer process 600 is performed by an operation flow that begins with a start operation 602 initiated when the chemical dispense system 100 is powered for operation at a customer's location. The file transfer process 600 is thus initiated at the conclusion of the installation process 500. As such, the file transfer process 600 is a procedure administered by the chemical dispense system 100 after the system 100 is initialized and fully operational. In accordance with an embodiment, the file transfer process 600 does not conclude after a single pass through the operation flow, but instead is performed so long as the chemical dispense system 100 is operational. For this reason, the operation flow of the file transfer process 600 does not include a terminating or concluding operation. From the start operation 602, the operation flow passes to a start timer operation 604.

The start timer operation 604 initiates a timer to start counting when the chemical dispense system 100 is powered on to normal operating conditions. From the start timer operation 604, the operation flow passes to a first query operation 606. The first query operation 606 reads the count of the timer to determine whether the count of the timer has reached a predetermined value. For example, the first query operation 606 may determine whether the count of the timer has reached a predetermined number of minutes, hours, days, weeks, months or years. The predetermined value may be set by either the customer or the service provider and, as described immediately below, defines when the file transfer mechanism 150 downloads data to and uploads data from the chemical dispense system 100.

The first query operation 606 branches the operation flow to a second query operation 608 if the first query operation 606 determines that the count of the timer has reached the predetermined value. In contrast, if the first query operation 606 determines that the count of the timer does not equal the predetermined value, then the operation flow continues in a loop back to the first query operation 606. This loop is continued until the first query operation 606 determines that the count of the timer has reached the predetermined value, at which time the first query operation 606 branches the operation flow to a second query operation 608.

The second query operation 608 checks whether any data files are to be transferred from the HMI 203 to the corporate server 154. In accordance with an embodiment, these data files may include device data, account data and/or chemical data. Device data is data associated with operating conditions of the chemical dispense system 100. Chemical data is data used by the chemical dispense system 100 to control formulation operations as component concentrates are being provided to the dispense location 210 from concentrate containers 106 via concentrate pumps, 108.

Account data may be broadly defined as all data not considered device or chemical data and may include, without limitation, business data related to invoice and financial information associated with the customer and/or chemical dispense system 100 or census data related to an operational demand or supply associated with the chemical dispense system 100. For instance, account data may include data specifying a volume of a particular chemical concentrate used by the chemical dispense system 100 in formulating or allocating one or more chemical products over a given period of time. The account data may also include data specifying a volume of a particular chemical product formulated or allocated by the chemical dispense system 100. In accordance with an embodiment of the present invention, the HMI 203 is programmed to gather such volumetric information and provide this information to the universal communicator 156 for transfer to the corporate server 154. The HMI 203 is also programmed to gather other forms of account data as well as device and chemical data. Data, whether account, chemical or device, gathered by the HMI 203 is stored locally to the chemical dispense system 100 in an "outbox" queue of the HMI 203.

The second query operation 608 determines whether any data files are awaiting transfer to the corporate server 154 by examining the HMI outbox queue. If the HMI outbox queue is empty, the second query operation 608 passes the operation flow to a fourth query operation 614, which is described in greater detail below. If, however, the HMI outbox queue is not empty, meaning that at least one data file is awaiting transfer from the HMI 203 to the corporate server 154, then the second query operation 608 passes the operation flow to the upload operation 610. The upload operation 610 transfers the one or more data files in the HMI outbox queue to the corporate server 154. As described with respect to FIG. 2, the universal communicator 156 is the portion of the file transfer mechanism 150 responsible for uploading account, chemical, and device data files from the HMI 203 to the corporate server 154. The universal communicator 156 and the corporate server 154 exchange data files via the network 155. Following the upload operation 610, the operation flow passes to a third query operation 612.

The third query operation 612 checks whether all data files stored in the HMI outbox queue were transferred to the HMI 203. If an error occurred during this transfer, the third query operation 612 branches the operation flow back to the upload operation 610. In accordance with an embodiment, the upload operation 610 transfers only those data files that were not properly transferred during the one or more previous upload attempts. In this embodiment, once a data file is properly transferred from the HMI 203 to the corporate server 154, that data file may be deleted from the HMI outbox queue, thereby providing space for later submitted data files. After a data file that was stored in the HMI outbox queue has been transferred from the HMI 203 to the corporate server 154, the third query operation 612 passes the operation flow to the fourth query operation 614.

The fourth query operation 614 determines whether the corporate server 154 is storing any instruction files awaiting transfer to the chemical dispense system 100. An instruction file contains an instruction for the chemical dispense system 100 to perform a specified task or operation. In accordance with an embodiment, an instruction file may specify a desired application for the chemical dispense system 100. An application is an instruction to formulate or allocate one or more chemical products within a given time period during a day. The application may define a sequence in which the chemical dispense system 100 formulates or allocates multiple chemical products in a pre-defined order. Either the customer or the service provider may input an instruction file specifying such an application for the chemical dispense system 100 by accessing the corporate server 154 via a customer communication module 151 and the service provider communication provider 152, respectively. Instruction files input to the corporate server 154 are stored in a queue on the corporate server 154 in accordance with an embodiment of the present invention. The queue is referred to herein as an "outbox" queue for the corporate server 154.

The fourth query operation 614 examines the corporate server outbox queue to determine whether any instruction files are present therein. If an instruction file is present in the corporate server outbox queue, the operation flow passes to a download operation 616. The download operation 616 transfers the instruction files stored in the corporate server outbox queue to the HMI 203. As described with respect to FIG. 2, the universal communicator 156 is the portion of the file transfer mechanism 150 responsible for downloading instruction files stored on the corporate server 154 to the HMI 203. The universal communicator 156 and the corporate server 154 exchange instruction files via the network 155. Following the download operation 616, the operation flow passes to a fifth query operation 618.

The fifth query operation 618 checks whether each instruction file stored in the corporate server outbox queue was transferred to the HMI 203. If an error occurred during this transfer, the fifth query operation 618 branches the operation flow back to the download operation 616. In accordance with an embodiment, the download operation 616 transfers only those instruction files from the corporate server 154 to the HMI 203 that were not properly transferred on the one or more previous download attempts. In this embodiment, once an instruction file is properly transferred from the corporate server 154 to the HMI 203, that instruction file may be deleted from the corporate server outbox queue, thereby providing space for later submitted instruction files.

After each instruction file that was stored in the corporate server outbox queue has been transferred from the corporate server 203 to the HMI 203, the fifth query operation 618 passes the operation flow to a reset timer operation 622. The reset timer operation 622 resets the count of the timer to zero such that the start timer operation 604 may re-initiate the counter to count toward the predetermined value. From the reset timer operation 622, the operation flow passes to the start timer operation 604 and continues as previously described.

Figure 7:
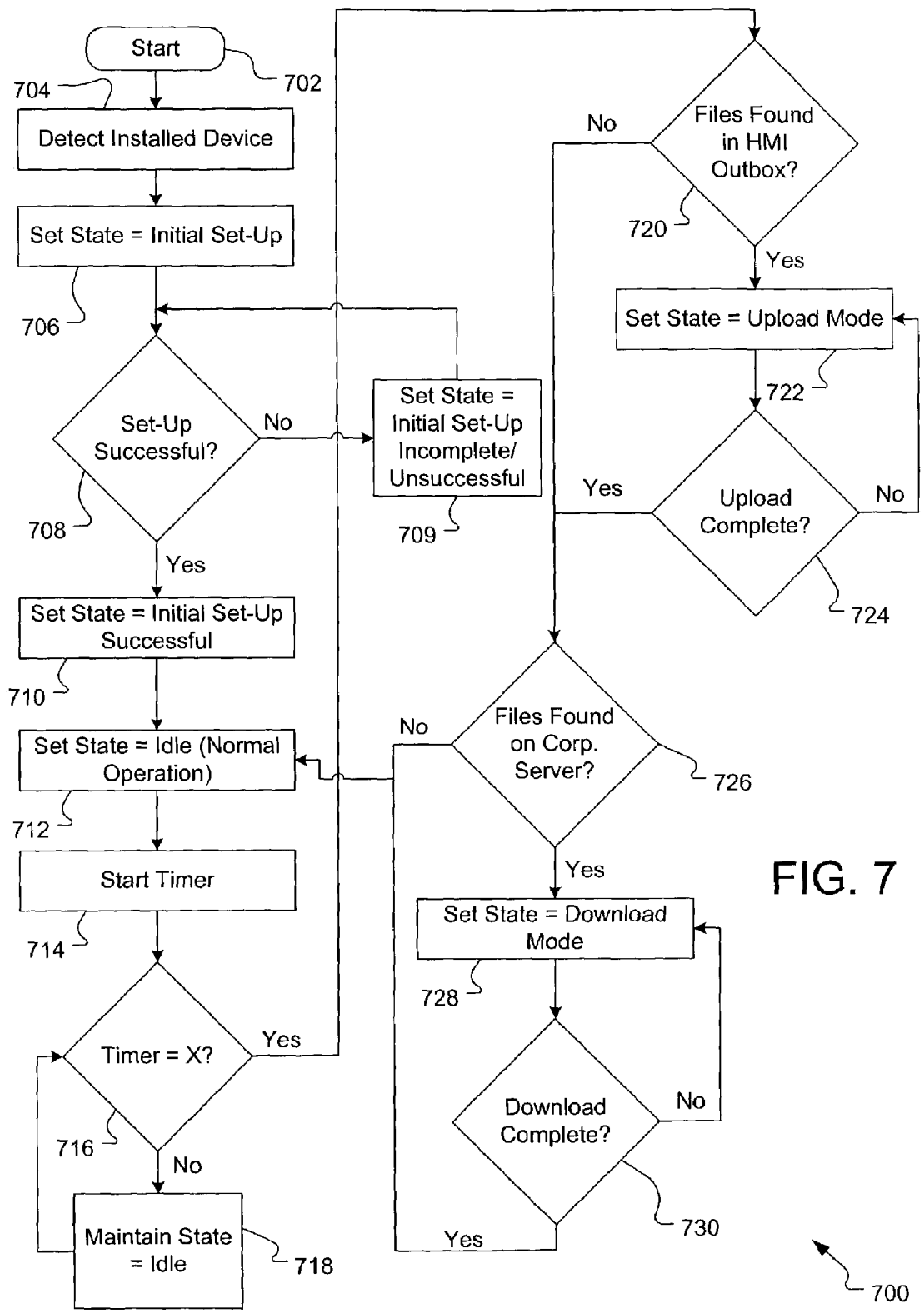
FIG. 7 is a flow diagram that illustrates operational characteristics shown in FIG. 6 in more detail in accordance with an embodiment of the present invention.

FIG. 7 illustrates operations of the HMI 203 as the chemical dispense system 100 operates in automated fashion to administer the file transfer process 600. As such, FIG. 7 shows a file transfer process 700 illustrating in more detail operations of the installation process 500 and the file transfer process 600 in accordance with an embodiment of the present invention. The file transfer process 700 shown in FIG. 7 is performed by an operation flow that begins with a start operation 702 initiated once the chemical dispense system 100 is initially set-up and initially powered for operation at a customer's location. The operation flow of the file transfer process 700 then continues so long as the chemical dispense system 100 is operational, and thus, does not include a terminating or concluding operation. Rather, the operations of the file transfer process 700 are performed in continuous fashion until power is removed from the chemical dispense system 100. From the start operation 702, the operation flow passes to a detect installation operation 704.

The detect installation operation 704 detects a chemical dispense system 100 connected to a file transfer mechanism 150. More particularly, the detect installation operation 704 is an operation performed by the HMI 203 that detects that the universal communicator 156 is connected to a corporate server 154 via a network 155. From the detect installation operation 704, the operation flow passes to a set state operation 706.

The set state operation 706 sets the state of the HMI 203 to an initial set-up state wherein an initial set of files is downloaded into the HMI 203. In the initial set-up state, the HMI 203 downloads device and configuration files required for operating the installed chemical dispense system 100. Different types of chemical dispense systems 100 require different device and configuration files. For example, a chemical dispense system 100 may have an allocator 104, but not a formulator 102. In which case, the device and configuration files for the formulator 102 would not be required and thus not downloaded into the HMI 203. Similarly, a chemical dispense system 100 may have a formulator 102, but not an allocator 104. In which case, the device and configuration files for the allocator 104 would not be required and thus not downloaded into the HMI 203. Furthermore, a chemical dispense system 100 may contain a point-of-use dispenser or a high volume dispenser. During the initial set-up state, the HMI 203 would therefore download device and configuration files for these added components.

During the initial set-up state, the HMI 203 also downloads information associated with the customer that has purchased or rented the installed chemical dispense system 100. In an embodiment, this information includes a user identification code assigned to the customer as well as other information specific to the customer, e.g., passwords, authorized operators, etc. Following the initial set-up state, the operation flow passes to a first query operation 708.

The first query operation 708 determines whether the required information has been downloaded to the HMI 203. Generally, there are two situations wherein the required information has not completed its download to the HMI 203. First, an error may have occurred during download and some required files may have been read from the corporate server 154, but may not have reached the HMI 203. Second, the HMI 203 may need more time to download the information. Under either circumstance, the first query operation 708 passes the operation flow to a first state change operation 709. The first state change operation 709 changes the state of the HMI 203 to reflect that the HMI 203 is still attempting to download information from the corporate server 154. The HMI 203 will thereafter remain in this state until the first query operation 708 determines that all required information has been downloaded into the HMI 203. Upon such a determination, the operation flow passes to a second state change operation 710.

The second state change operation 710 changes the state of the HMI 203 to reflect that the initial file download was successful. From the second state change operation 710, the operation flow passes to a third state change operation 712. The third state change operation 712 changes the state of the HMI 203 to an idle state. During the idle state, the HMI 203 operates under normal operating conditions wherein files are downloaded and uploaded in predetermined increments of time. Once the HMI 203 is set to the idle state, the operation flow passes to a start timer operation 714.

The start timer operation 714 initiates a timer to start counting when the chemical dispense system 100 is powered on to normal operating conditions. From the start timer operation 714, the operation flow passes to a second query operation 716. The second query operation 716 reads the count of the timer to determine whether the count of the timer has reached the predetermined value described above with reference to the first query operation 606 shown in FIG. 6. If the count on the timer has not reached the predetermined value, the operation flow passes to maintain state operation 718 and the idle state is maintained in the HMI 203 until the count of the timer reaches the predetermined value. Once the count reaches this predetermined value, the second query operation 716 passes the operation flow to a third query operation 720.

The third query operation 720 examines the HMI outbox queue to determine whether any data files are awaiting transfer to the corporate server 154. If at least one data file is awaiting transfer from the HMI outbox queue to the corporate server 154, the third query operation 720 passes the operation flow to a fourth state change operation 722. The fourth state change operation 722 changes the state of the HMI 203 to an upload state. In the upload state, the HMI 203 transfers the data files contained in the outbox queue to the corporate server 154.

Once the state of the HMI 203 is changed to the upload state, the operation flow passes to a fourth query operation 724. The fourth query operation 724 determines whether all data files stored in the HMI outbox queue have been uploaded to the corporate server 154. In accordance with an embodiment, the upload state includes two different levels of uploading. In a first level, the data files are transferred from the HMI outbox queue to the universal communicator 156. In a second level, the data files are transferred from the universal communicator 156 to the corporate server 154.

Generally, there are two situations wherein the uploading of the data files may be considered incomplete. First, an error may have occurred during uploading and some data files may have been read from the HMI outbox queue, but may not have reached the corporate server 154. Second, the HMI 203 may need more time to upload the data files. Under either circumstance, the fourth query operation 724 passes the operation flow back to the fourth state change operation 722 such that the HMI 203 remains in the upload state. The HMI 203 will thereafter remain in the upload state until the fourth query operation 734 determines that all data files have been uploaded from the HMI outbox queue to the corporate server 154 or the daily upload time window has passed. Upon such a determination or if the third query operation 720 determines that no data files were contained in the HMI outbox queue, the operation flow passes to a fifth query operation 726.

The fifth query operation 726 determines whether any instruction files are presently stored in the outbox queue of the corporate server 154. The fifth query operation 726 passes the operation flow to a fifth state change operation 728 if it is determined that instruction files are contained in the corporate server outbox queue. The fifth state change operation 728 changes the state of the HMI 203 to a download state wherein the instruction files contained in the corporate server outbox queue are downloaded from the corporate server 154 to the HMI 203. Once the state of the HMI 203 is changed to the download state, the operation flow passes to a sixth query operation 730. The sixth query operation 730 determines whether all instruction files stored in the corporate server outbox queue have been downloaded to the HMI 203.

Generally, there are two situations wherein the downloading of the instruction files may be considered incomplete. First, an error may have occurred during downloading and some instruction files may have been read from the corporate server 154, but may not have reached the HMI 203. Second, the HMI 203 may need more time to download the instruction files. Under either circumstance, the sixth query operation 730 passes the operation flow back to a fifth state change operation 728 such that the HMI 203 remains in the download state. The HMI 203 will thereafter remain in the download state until the sixth query operation 730 determines that all instruction files have been downloaded into the HMI 203. Upon such a determination or if the fifth query operation 726 determines that no instruction files were contained in the corporate server outbox queue, the operation flow passes to back to the third state change operation 712, wherein the HMI 203 is reset back to the idle state and the operation flow continues as previously described.

Figure 8:
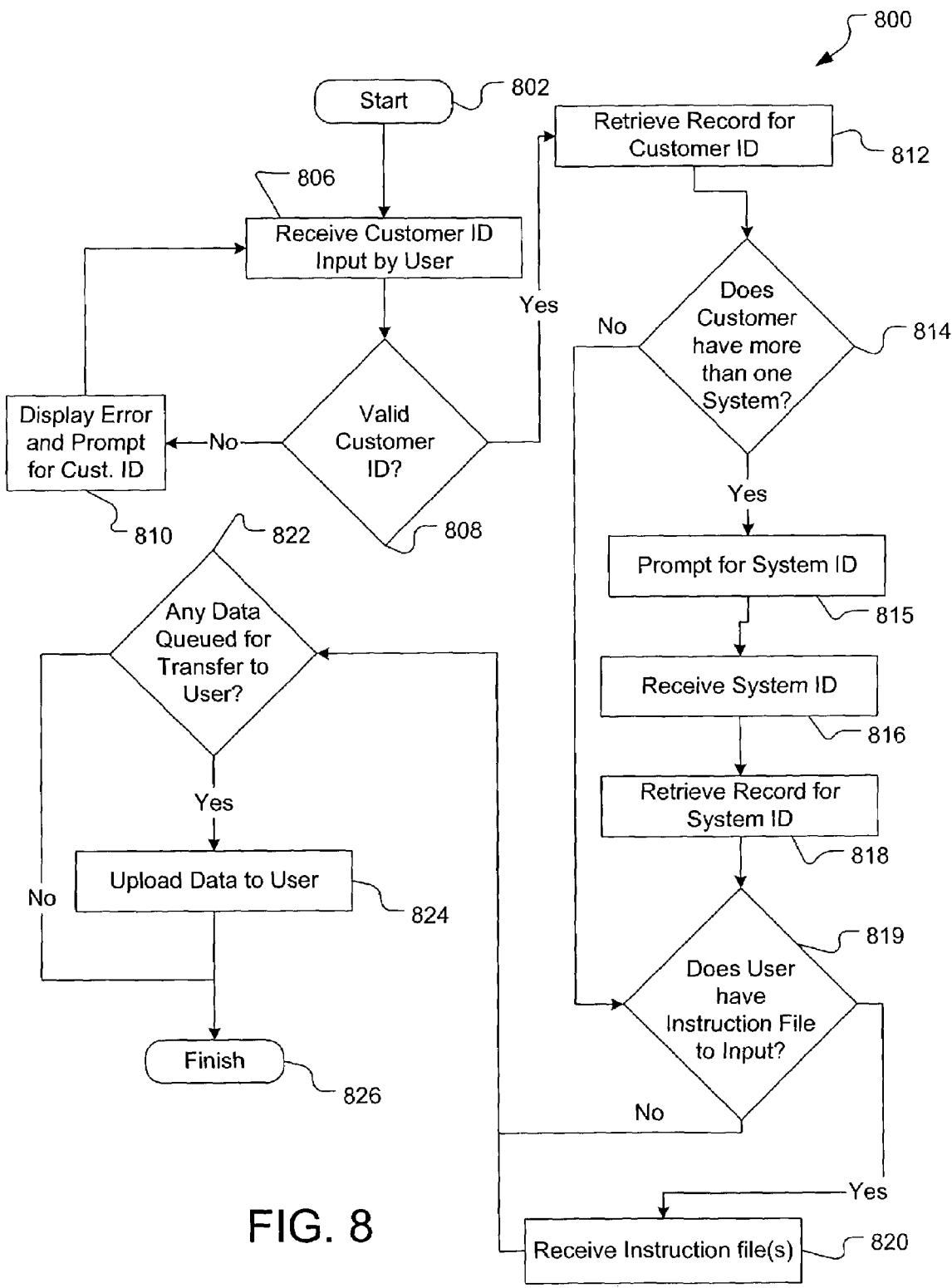
FIG. 8 is a flow diagram that illustrates operational characteristics for remotely accessing a corporate server of the communications system of FIG. 2 in accordance with an embodiment of the present invention.

Referring now to FIG. 8, a process 800 for remotely accessing the corporate server 154 is shown in accordance with an embodiment of the present invention. The remote access process 800 shown in FIG. 8 enables users to input instruction files directed to a chemical dispense system 100 and receive data files associated with that system 100 from a remote location. Although the remote access process 800 may be used by any type of system operator, e.g., field service provider, account manager, to input instruction files and receive data files, the remote access process 800 is illustrated in FIG. 8 as being used by an account manager.

Account managers typically manage multiple customer accounts. It should therefore be appreciated that the account manager may use the remote access process 800 to serve as an administrator authorized to control and monitor all aspects of multiple chemical dispense systems 100 associated with multiple customers. An account manager is therefore given a wider range of access to the corporate server 154 than a customer. With this wide range of access, an account manager may use the remote access process 800 to input any type of instruction file for controlling a chemical dispense system 100 including, without limitation, instruction files operable to turn on and off chemical dispensing operations of the system 100, and receive any type of data gathered or generated by the system 100.

In accordance with an embodiment, a customer may use the remote access process 800 to receive specific types of device, chemical and account data associated with that customer. In other embodiments, the customer may also use the remote access process 800 to input specific instruction files. The range of access given each customer, i.e., the specific instruction files that the customer may input and the specific types of data that the customer may receive, are either set independently by the service provider or by mutual agreement between the customer and the service provider in accordance with embodiments of the present invention.

The remote access process 800 is performed by an operation flow beginning with a start operation 802 and concluding with a terminate operation 826. The start operation 802 is initiated as an account manager accesses the corporate server 154 from a remote location. In accordance with an embodiment, the account manager accesses the corporate server 154 over a network connection to the service provider's communication module 151. The network connection may be land-based or wireless. The service provider's communication module 151 is a computing system having a web browsing application program through which the account manager initiates access to the corporate server 154 in accordance with another embodiment. The start operation 802 may be initiated at any time following termination of the installation process 500, and thus initialization of the chemical dispense system 100. From the start operation 802, the operation flow passes to a first receive operation 806.

The first receive operation 806 receives a customer identification code input by the account manager. A customer identification code is assigned to each customer having an account on the corporate server 154. Each customer identification code is associated with a customer identification record that stores information associated with each customer. These customer identification records are stored locally on the corporate server 154 and include various types of information associated with each customer. In accordance with an embodiment, the customer identification records include a system identification record for each chemical dispense system 100 associated with a particular customer. After the customer identification code is received by the first receive operation 806, the operation flow passes to a first query operation 808.

The first query operation 808 compares the received customer identification code against a list of customer identification records to determine whether the received customer identification code is a valid code. If the received customer identification code does not match a customer identification record, the first query operation 808 branches the operation flow to a prompt customer identification operation 810. The prompt customer identification operation 810 prompts the account manager accessing the corporate server 154 that the customer identification code input into the server 154 is not a valid customer identification code. The prompt customer identification operation 810 also prompts the account manager to input a subsequent customer identification code. From the prompt customer identification operation 810, the operation flow passes back to the first receive operation 806 and continues to the first query operation 808 as previously described. Once the first query operation 808 finds a match for a received customer identification code, the first query operation 808 passes the operation flow to a first retrieve operation 812.

The first retrieve operation 812 retrieves the customer identification record matching the customer identification code. From the first retrieve operation 812, the operation flow passes to a second query operation 814. The second query operation 814 determines whether the customer identified by the customer identification code is associated with more than one chemical dispense system 100. If the customer is associated with more than one chemical dispense system 100, the second query operation 814 passes the operation flow to a prompt system identification operation 815. The prompt system identification operation 815 prompts the account manager for a system identification code identifying the chemical dispense system 100 that the account manager desires to monitor and/or control during this remote access session. In accordance with an embodiment, the web browsing application enables the account manager to select the desired chemical dispense system 100 from a list using a convention computer mouse or other pointing device. From the prompt system identification operation 815, the operation flow passes to a second receive operation 816.

The second receive operation 816 receives the system identification code input by the account manager. From the second receive operation 816, the operation flow passes to a second retrieve operation 818. The second retrieve operation 818 retrieves the system identification record associated with the system identification code selected or input by the account manager such that the record may be manipulated by the account manager during this remote access session. After the system identification record is retrieved, the operation flow passes to a third query operation 819.

The third query operation 819 determines whether the account manager has accessed the corporate server 154 to input one or more instruction files for the chemical dispense system 100 identified by the system identification code. In accordance with an embodiment, the third query operation 819 makes this determination by receiving an answer from the account manager in response to a prompt as to whether the account manager desires to input instruction files. The third query operation 819 passes the operation flow to an, instruction file receive operation 820 if the account manager desires to input one or more instruction file(s).

The instruction file receive operation 820 receives the instruction file(s) input by the account manager and stores the file(s) on the corporate server 154. Following the instruction file receive operation 820, the operation flow passes to a fourth query operation 822, which is described in the following paragraph. If, however, the third query operation 819 determines that the account manager has not accessed the corporate server 154 to input instruction files for the chemical dispense system 100, the third query operation 819 passes the operation flow to the fourth query operation 822.

The fourth query operation 822 determines whether the corporate server 154 is storing data files that are to be transferred for presentation to the account manager. As noted above, these data files may include device, chemical or account information associated with the chemical dispense system 100. Using information stored on the corporate server 154, the account manager may monitor various types of information associated with the chemical dispense system 100, such as, without limitation, the volume of a chemical concentrate used by the system 100 over a given period of time, the volume of a chemical product formulated or allocated during a given period of time, the cost associated with either volumes, the operating conditions of the system 100, the status of applications that the customer had earlier requested, and whether a certain concentrate or product needs replenishment.

The fourth query operation 822 passes the operation flow to upload operation 824 if it is determined the corporate server 154 is storing data files that are to be provided to the account manager. The upload operation 824 transfers the data files from the corporate server 154 to the account manager. The data files are provided to the account manager as information presented on an information page of the web browsing application in accordance with an embodiment of the present invention. From the upload operation 824 or if the fourth query operation 822 determines that the corporate server 154 is not storing data files to be provided to the customer, the operation flow concludes with the terminate operation 826. In accordance with an embodiment, instances of the remote access process 800 may be simultaneously performed multiple times wherein multiple customers access the corporate server 154 to control and/or monitor operations of a chemical dispense system 100. Further, instances of the remote access process 800 may be sequentially and/or simultaneously performed by a single account manager to control and/or monitor multiple chemical dispense systems 100.

Figure 9:
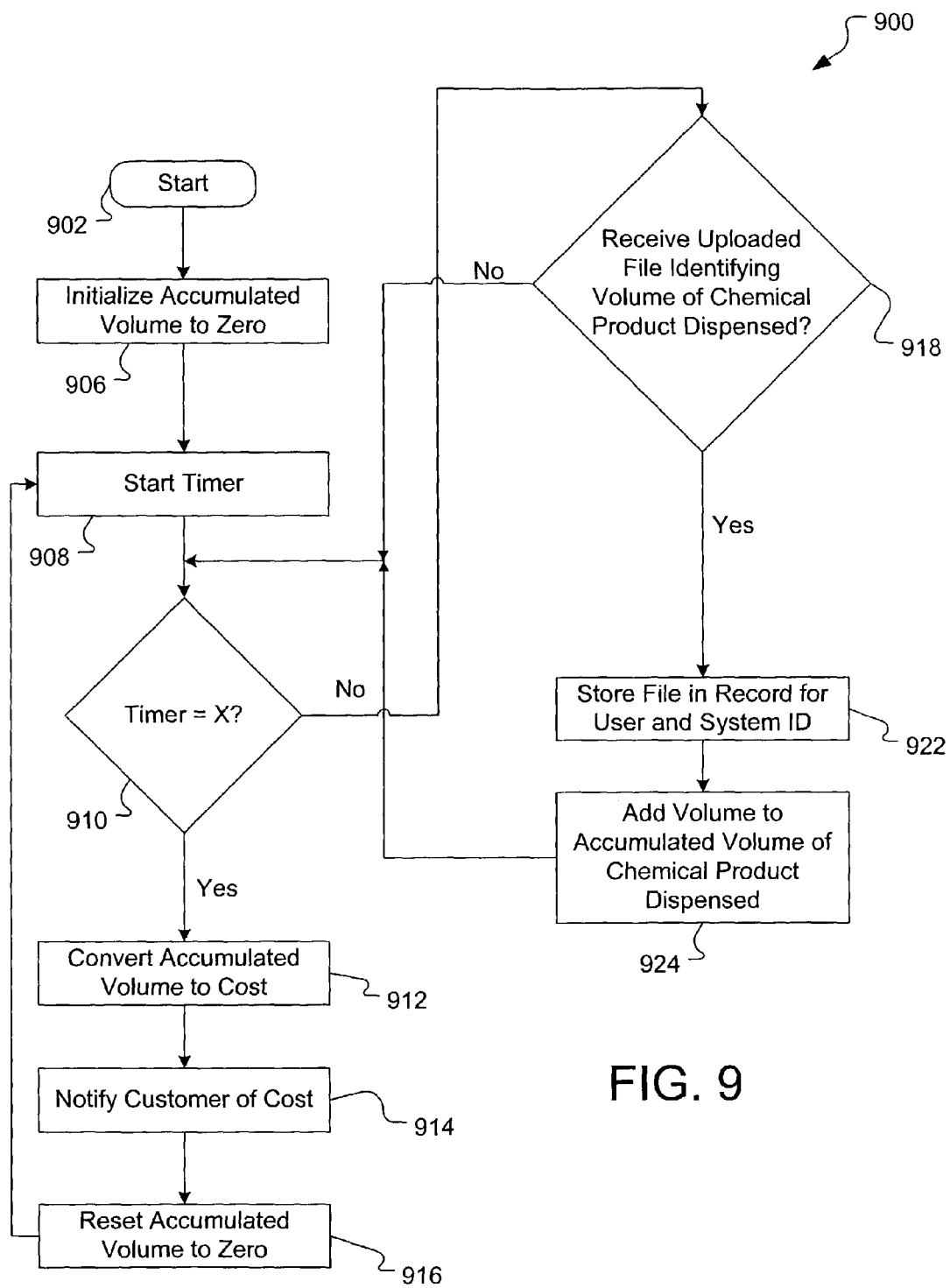
FIG. 9 is a flow diagram that illustrates operational characteristics for automatically generating account data for a chemical product dispensed by the chemical dispense system of FIG. 1 over a given period of time and periodically providing a customer with cost information based on the generated account data in accordance with an embodiment of the present invention.

Referring now to FIG. 9, an invoice generation process 900 for automatically generating account data for a chemical product dispensed, i.e., allocated or formulated, by a chemical dispense system 100 over a given period of time and periodically providing a customer with cost information based on the generated account data is shown in accordance with an embodiment of the present invention. As noted above, account data relates to business or demand/supply aspects of the chemical dispense system 100. Account data may therefore include information associated with ancillary aspects of chemical dispensing operations, such as, without limitation, concentrate supply/demand, per-use characteristics, concentrate use relative to a given period of time, chemical product supply/demand and chemical product dispensing, i.e., formulation or allocation, relative to a given period of time. For instance, account data may include data that identifies the volume of chemical concentrates used or chemical products formulated/allocated by the chemical dispense system 100 over a given period of time.

In accordance with an embodiment of the present invention, the invoice generation process 900 is used to provide a customer with periodic statements concerning a balance due to a service provider for chemical products formulated or allocated using a chemical dispense system 100 maintained and serviced by the service provider. For clarity, the invoice generation process 900 is described below as generating account data for only a single chemical product dispensed using the chemical dispense system 100 over a given period of time and thereafter providing an invoice statement having cost information for the single chemical product over the given period of time. The cost information is based on the account data. However, the invoice generation process 900 may be used to generate account data for multiple chemical products in either simultaneous or sequential fashion, or both. Indeed, the invoice statement may include cost information associated with multiple chemical products dispensed using the chemical dispense system 100 over the given period of time.

The invoice generation process 900 is performed by an operation flow beginning with a start operation 902 initiated when the chemical dispense system 100 is powered for normal operation at the customer's location. The operation flow of the invoice generation process 900 then continues so long as the chemical dispense system 100 is operational, and thus, does not include a terminating or concluding operation. Rather, the operations of the invoice generation process 900 are performed in continuous fashion until power is removed from the chemical dispense system 100. In this manner, the invoice generation process 900 provides periodic invoice statements to the customer until the chemical dispense system 100 is no longer operational. From the start operation 902, the operation flow passes to an initialize operation 906.

The initialize operation 906 initializes an accumulated volume parameter to zero. The accumulated volume parameter is used later in the operation flow of the invoice generation process 900 to generate account data for the chemical product. From the initialize operation 906, the operation flow passes to a start timer operation 908. The start timer operation 908 initiates a timer to start counting substantially immediately after the initialize operation 906 initializes the accumulated volume parameter to zero. From the start timer operation 908, the operation flow passes to a first query operation 910. The first query operation 910 reads the count of the timer to determine whether the count of the timer has reached a predetermined value. For example, the first query operation 910 may determine whether the count of the timer has reached a predetermined number of minutes, hours, days, weeks, months or years. In accordance with an embodiment, the predetermined value represents the given period of time in which the customer has requested to measure cost information for the chemical product. For example, the predetermined value is set to thirty days if a customer has requested to receive an invoice statement containing the balance due on a particular chemical product dispensed through the customers system every thirty days.

The first query operation 910 branches the operation flow to a second query operation 918 if the first query operation 910 determines that the count of the timer has not reached the predetermined value. The second query operation 918 determines whether a finite volume of the chemical product has been dispensed by the chemical dispense system 100 since the last time that the second query operation 918 made such a determination. In accordance with an embodiment, the second query operation 918 makes this determination based on whether the corporate server 154 has received any new account data that identifies a volume of the chemical product as dispensed by the system. If the second query operation determines that a finite volume of the chemical product has not been dispensed by the chemical dispense system 100, the operation flow passes back to the first query operation 910. The operation flow continues between the first query operation 910 and the second query operation 918 until the count of the timer reaches the predetermined value. If, however, the second query operation 918 determines that a finite volume of the chemical product has been dispensed by the chemical dispense system 100 since the last time that the second query operation 918 made this determination, the operation flow passes to a storage operation 922.

The storage operation 922 stores the volumetric information to the appropriate system identification record of the user identification record corresponding to the user identification code assigned to the customer. The system identification record is determined based on the system identification code assigned to the chemical dispense system 100 from where the data was gathered. From the storage operation 922, the operation flow passes to an accumulate operation 924. The accumulate operation 924 adds the finite volume stored into the appropriate system identification record to the accumulated volume parameter. The accumulated volume parameter therefore grows with each finite volumetric measure received by the corporate server 154 for the chemical product until the count of the timer reaches the predetermined value. From the accumulate operation 924, the operation flow passes back to the first query operation 910 and continues as previously described.

Once the first query operation 910 determines that the count of the timer reaches the predetermined value, the first query operation 910 passes the operation flow to a convert operation 912. The convert operation 912 converts the accumulated volume parameter to cost information, thereby rendering a balance due on the chemical product over the given period of time. After the cost information is determined, the operation flow passes to a notify operation 914.

The notify operation 914 generates an invoice statement that includes the cost information rendered by the convert operation 912. The notify operation 914 also submits the invoice statement to the customer in a manner requested by the customer. For example, the customer may prefer to receive invoice statements via electronic mail, U.S. mail, pager services, telephone service, etc. From the notify operation 914, the operation flow passes to a reset operation 916. The reset operation 916 resets the accumulated volume parameter to zero, thereby preparing the invoice generation process 900 for the next operation flow iteration. From the reset operation 916, the operation flow passes back to the start timer operation 908 and continues as previously described above.

Figure 10:
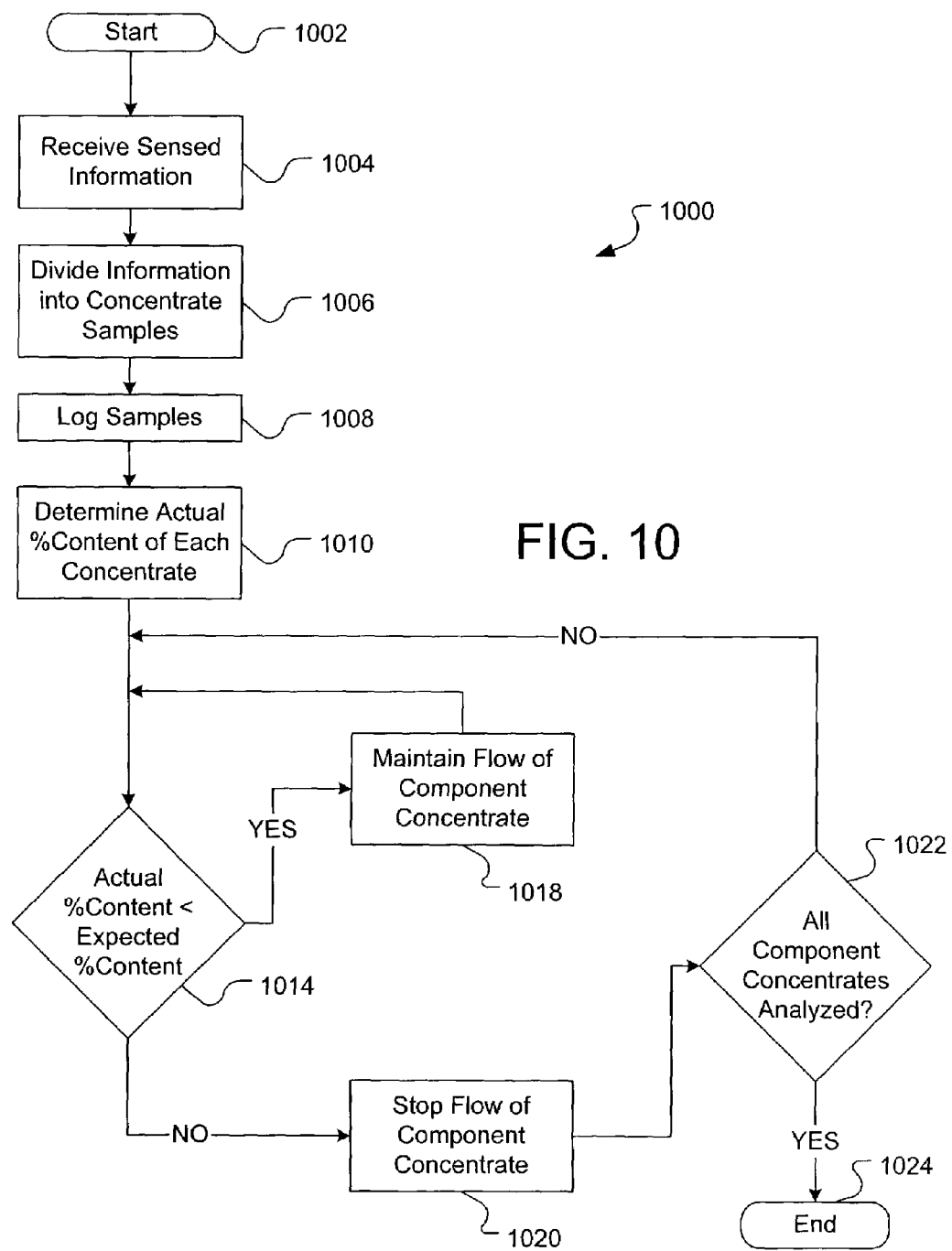
FIG. 10 is a flow diagram that illustrates operational characteristics for monitoring and controlling formulation of a chemical product in accordance with an embodiment of the present invention.

FIG. 10 illustrates operations performed by the control system 200 as the system 200 receives volumetric information associated with each component chemical concentrate used to form a chemical product and thereafter processes the volumetric information to monitor and control formulation of the chemical product in accordance with an embodiment of the present invention. Specifically, a process 1000 generally illustrating operations for monitoring and controlling formulation of a chemical product is shown comprising an operation flow beginning with a start operation 1002 and concluding with a terminate operation 1024. For simplicity, the monitor/control process 1000 is described below as monitoring and controlling formulation of a single chemical product. However, the monitor/control process 1000 may be used to simultaneously monitor and control formulation of multiple chemical products.

The operation flow begins at the start operation 1002 and continues to a receive operation 1004. The receive operation 1004 receives various forms of measured information associated with the chemical product to be formulated. In accordance with an embodiment, the measured information is volumetric information associated with each component chemical concentrate used in forming the chemical product. As the sensed information is received, the operation flow passes to a divide operation 1006. The divide operation 1006 separates the sensed information into concentrate samples, with each concentrate sample being associated with a specific component chemical concentrate of the chemical product. As such, each sample may be assigned to a concentrate category. Because the component concentrates are provided to the formulator 102 in sequential, and not simultaneous, fashion in accordance with an embodiment, the divide operation 1006 assigns each concentrate sample into a specific concentrate category based on which concentrate pump 108 is activated as the sample is sensed from the component chemical concentrate. In accordance with an alternative embodiment wherein the component concentrates are provided to the formulator 102 in simultaneous fashion, each component concentrate is monitored by the monitor operation 1006 prior to being combined in the formulator 102. After the information is divided into samples identified by a specific component concentrate, the operation flow passes to a log operation 1008.

The log operation 1008 further divides the sensed information samples associated with concentrate categories into information categories. The information categories identify a specific monitored aspect of the component chemical concentrate to which each sample relates. For example, one sample associated with volume/weight percent of a component chemical concentrate may be divided from another sample associated with alkalinity of the component chemical concentrate, with each sample being identified using a particular information category. As such, one sample may be identified using a weight percent category, the other using an alkalinity category.

The log operation 1008 may also store the samples in concentrate category records and further into concentrate information records, based on concentrate and information categories, respectfully. By storing information samples in records, the information may be readily uploaded for monitoring and controlling. Device, chemical and account data gathered by the monitor/control process 1000 is stored in the HMI outbox queue for subsequent upload to the corporate server 154. The data is uploaded to the corporate server 154 at predetermined times, as described above in FIGS. 6 and 7. An authorized user may subsequently access the HMI 203 locally or remotely via the corporate server 154. An authorized user may therefore monitor the formulation of the chemical product and is provided information such as, without limitation, proof of delivery of a concentrate to the chemical product. The operation flow passes from the log operation 1008 to a determination operation 1010.

The determination operation 1010 calculates the actual percent volume, mass or weight of each component chemical concentrate used in formulating the chemical product at different points in time wherein the chemical product, currently being formulated, is filling up in a jug or a drum. At the conclusion of formulation, the chemical product may be considered "formed." Specifically, as samples are received and divided into concentrate category records and further into information category records, information related to the actual volume of each concentrate dispensed to a dispense location 210 is combined with like information from previous samples to generate a current weight percent of each component concentrate currently forming the product. Each current weight percent represents percent volume based on specific gravity of a component chemical concentrate forming the collection of component concentrates currently situated in the jug or the drum. As such, the current weight percent of one component chemical concentrate is measured relative to all other component chemical concentrates situated in the jug or drum. From the determination operation 1010, the operation flow passes to a first query operation 1014.

The first query operation 1014 is a repetitive analysis that is repeated for each component chemical concentrate used in formulating the chemical product. Thus, on an initial pass, the first query operation 1014 determines whether the current weight percent for a first component chemical concentrate is less than an expected weight percent for that component chemical concentrate in the formed chemical product. If the current weight percent of the component concentrate being analyzed is less than the expected weight percent, the operation flow passes to a maintain flow operation 1018. The maintain flow operation 1018 maintains the flow of the first component concentrate from the associated concentrate container 106 to the manifold 212. From the maintain flow operation 1018, the operation flow returns to the first query operation 1014. The operation flow therefore continues to pass between the first query operation 1014 and the maintain flow operation 1018 until the current weight percent of the component concentrate being analyzed is greater than or equal to the expected weight percent. Once the current weight percent is greater than or equal to, i.e., not less than, the expected weight percent, the operation flow passes to a stop flow operation 1020. The stop flow operation 1020 stops pulling the first component chemical concentrate from the associated concentrate container 106 to the dispense location 210., Following the stop operation 1020, the operation flow passes to a second query operation 1022. The second query operation 1022 determines whether the current weight percent of each component chemical concentrate forming that chemical product has been analyzed against an expected weight percent. If each component chemical concentrate has not been analyzed, the operation flow passes back to the first query operation 1014 and continues as described above. The operation flow thus repeats the first query operation 1014, the second query operation 1022, the maintain flow operation 1018 and the stop flow operation 1020 for each of the component chemical concentrates making up the chemical product. After all the component chemical concentrates used in forming the chemical product are analyzed, the operation flow concludes with the terminate operation 1024.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. Numerous changes may be made which will readily suggest themselves to those skilled in the art and which are encompassed in the spirit of the invention disclosed and as defined in the appended claims.

What is claimed is:

1. A system comprising:
   a chemical dispense system comprising:
   a formulator that prepares a chemical product by combining a plurality of component chemical concentrates at a dispense location; and
   an allocator that distributes the chemical product to a point-of-use;
   a controller that manages operation of the chemical dispense system;
   a network sewer that receives an instruction file that requests formulation of a specific chemical product using a specified plurality of component chemical concentrates and requests distribution of a plurality of formulated chemical products in a specified sequence and stores the instruction file in a queue for a predetermined period in time; and
   a universal communicator communicatively connected to the network sewer by way of a communications network that receives instruction file from the network server, wherein the universal communicator is operable to automatically provide the received instruction file to the controller at the end of the predetermined period in time, wherein the controller administers performance of the specified task pursuant to the instruction file, wherein the controller generates a data file that specifics a volume of the specific chemical product formulated over a given period in time, and wherein the universal communicator transfers the data file from the controller to the network server.

2. The system method of claim 1 wherein the controller creates an invoice statement that lists a balance due on the specific chemical product based on the volume formulated over the given period in time.

3. The system of claim 1 wherein the controller automatically transfers device data associated with operating conditions of the chemioal dispense system to the network server.

4. The system of claim 1 wherein the controller automatically transfers account data related to business or demand/supply aspects of the chemical dispense system to the network server.

5. The system of claim 1 wherein the controller automatically transfers the data files from the chemical dispense system to the network server via a network.

6. The system of claim 1 wherein the controller automatically transfers the data files system to the network server via at least one of a wide area network, a local area network or the Internet.

* * * * *

UNITED STATES PATENT AND TRADEMARK OFFICE
CERTIFICATE OF CORRECTION

PATENT NO. : 7,292,914 B2  Page 1 of 1
APPLICATION NO. : 10/188620
DATED : November 6, 2007
INVENTOR(S) : Jungmann et al.

It is certified that error appears in the above-identified patent and that said Letters Patent is hereby corrected as shown below:

Title page, Number (75), Column 1, inventor name, "James M. Zoll", should read, --James M. Zell--

On Column 27, Line 11, "sewer", should read, --server--

On Column 27, Line 19, "sewer", should read, --server--

On Column 28, Lines 1 and 2, "specifics", should read, --specifies--

On Column 28, Line 12, "chemioal", should read, --chemical--

Signed and Sealed this

Tenth Day of June, 2008

JON W. DUDAS
*Director of the United States Patent and Trademark Office*